United States Patent
Cookmeyer, II et al.

(10) Patent No.: US 6,526,044 B1
(45) Date of Patent: Feb. 25, 2003

(54) REAL-TIME ANALYSIS THROUGH CAPTURE BUFFER WITH REAL-TIME HISTORICAL DATA CORRELATION

(75) Inventors: Eugene N. Cookmeyer, II, Apex, NC (US); Jay E. Novak, Durham, NC (US)

(73) Assignee: Wandel & Goltermann Technologies, Inc., Research Triangle Park, NC (US)

( * ) Notice: Subject to any disclaimer, the term of this patent is extended or adjusted under 35 U.S.C. 154(b) by 0 days.

(21) Appl. No.: 09/342,384

(22) Filed: Jun. 29, 1999

(51) Int. Cl.[7] ................................................. H04J 15/00
(52) U.S. Cl. ...................................................... 370/352
(58) Field of Search ............................. 370/252; 707/10

(56) References Cited

U.S. PATENT DOCUMENTS 6,363,384 B1 * 3/2002 Cookmeyer et al. .......... 707/10

OTHER PUBLICATIONS

"Local Area Network Analyzer", IBM Tec. Discl. Bull, vol. 36, No. 2, pp 39–42, (Feb. 1993).*

* cited by examiner

Primary Examiner—Salvatore Cangialosi
(74) Attorney, Agent, or Firm—Dominic J. Chiantera; Moore & Van Allen PLLC

(57) ABSTRACT

A knowledge based system uses a protocol analyzer which acquires real time statistical data on network signal traffic in a monitoring session and reports a session performance history as a real time composite of measured statistics and analysis-derived statistics, together with a real time report of discarded frames.

24 Claims, 31 Drawing Sheets

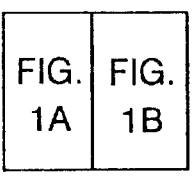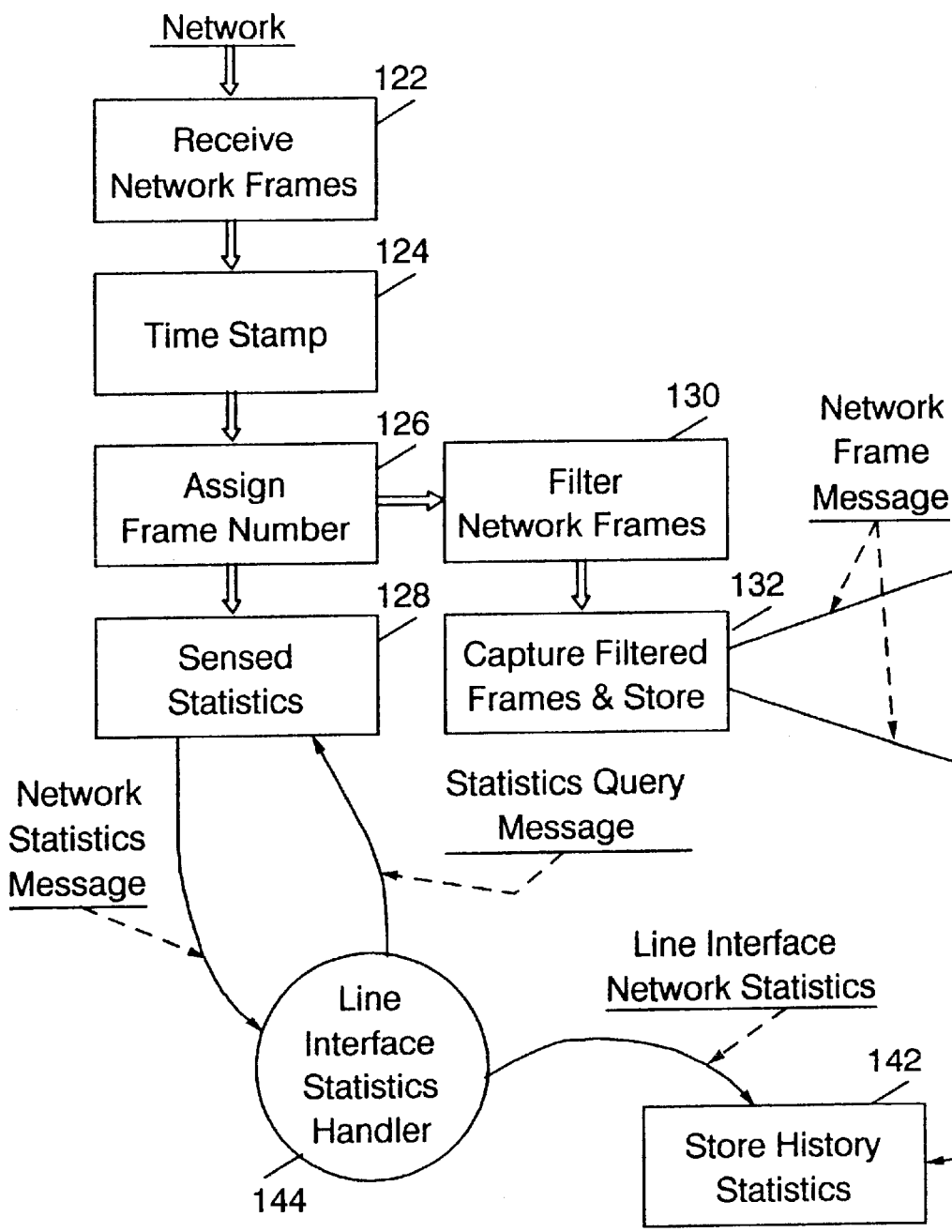
FIG. 1A

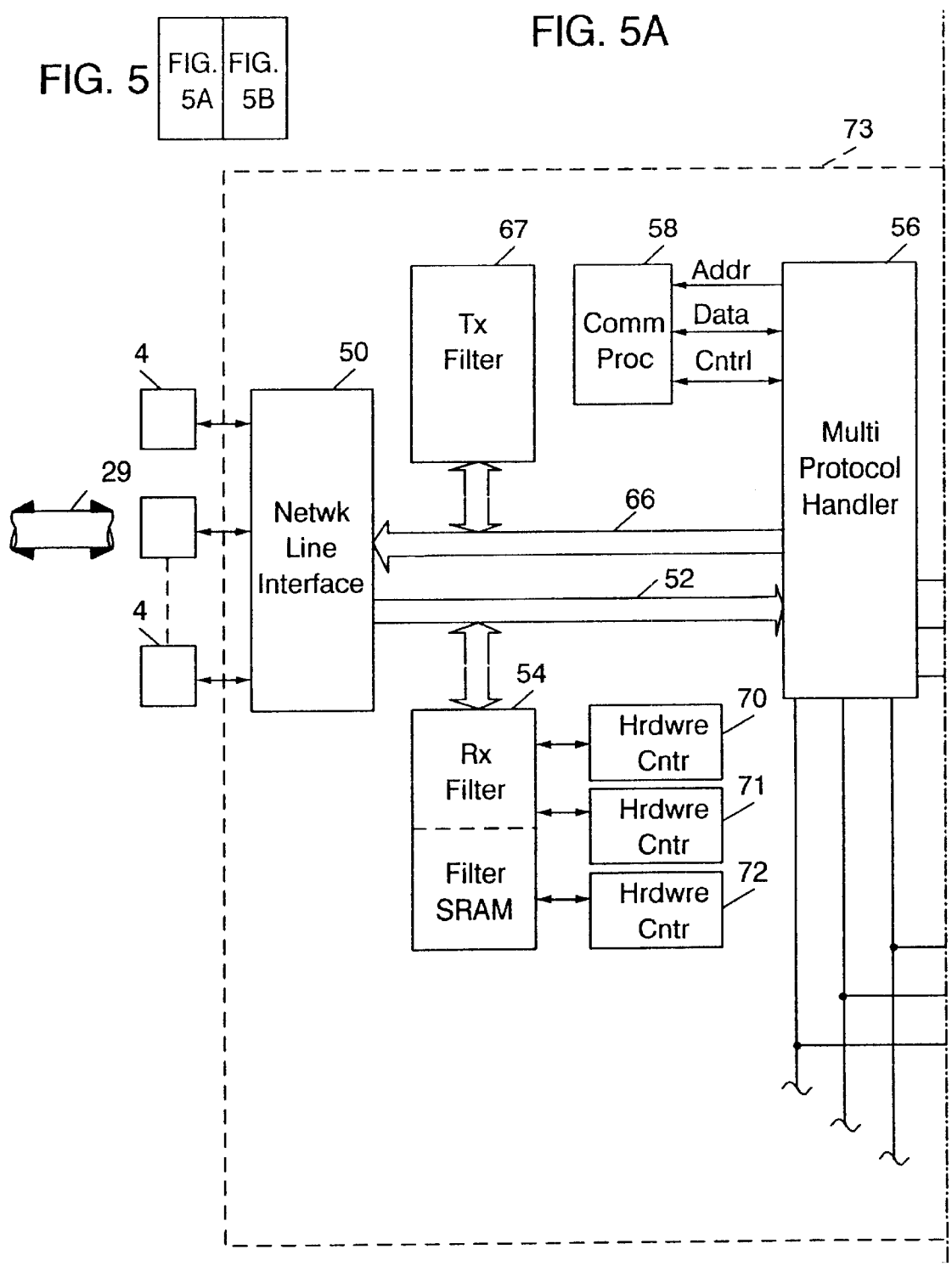

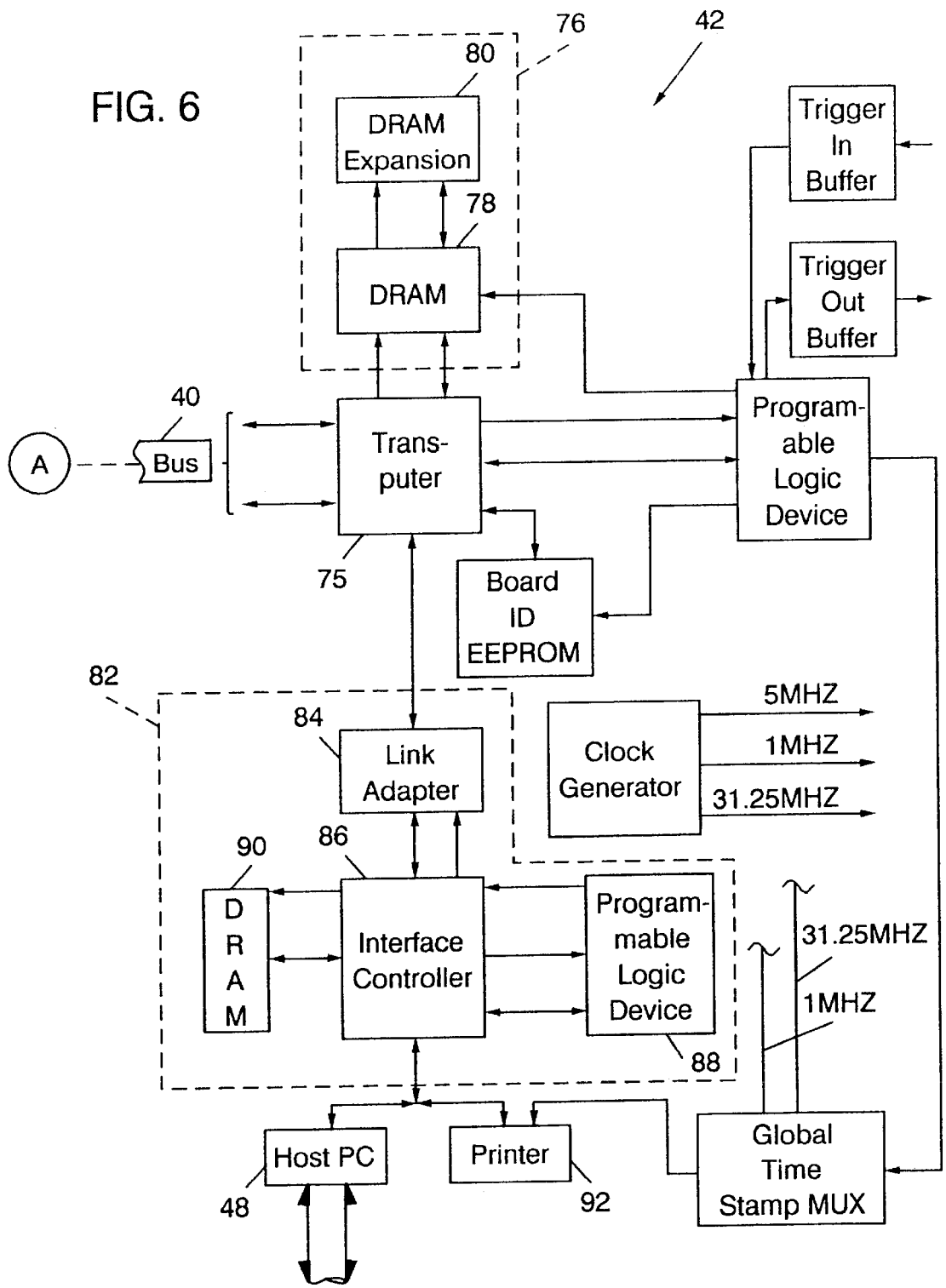

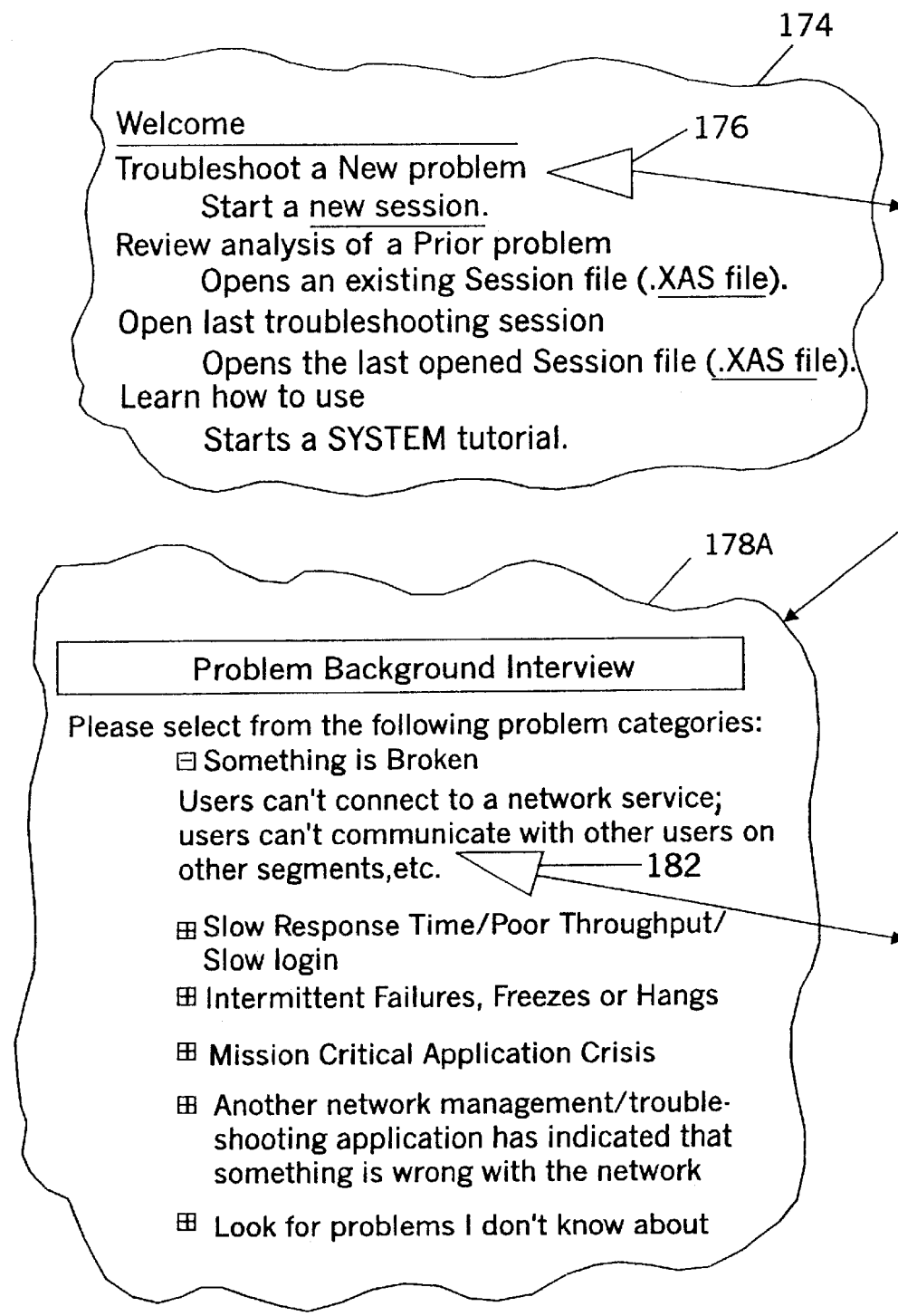

FIG. 11

| FIG. 11A | FIG. 11B |

FIG. 11A

Problem Background Interview — 188

What type of service?
- The users are connecting to file services
- The users are connecting to printing services
- The users are connecting using gateway services to another device
- The users are connecting to a mid range computer, mainframe or other computer that requires terminal login
- The users are connecting to a Web server — 190
- The users are connecting to a SQL/Database server
- None of the above (A)

Problem Background Interview — 206

The application will now proceed to the analysis phase of this session. Before proceeding, it is highly recommended that you read the Recommendations Before Start of Analysis.

Click Here to troubleshoot this problem — 208

Below is a summary of the information you've provided so far in the Problem Background Interview. Please check it for accuracy. If any of the information is wrong, click on that statement to correct it and answer questions that follow.

- Something is broken
- Users can't connect to a network service
- The users are connecting to a Web server
- The web service is up and operating and other users can access the server
- The user's TCP/IP stack and Web Browser is correctly configured
- The physical connection to the network does not appear to be broken

Problem Background Interview

The application will now proceed to the analysis phase of this session. Before proceeding, it is highly recommended that you read the Recommendations Before Start of Analysis.

Click Here to troubleshoot this problem

Below is a summary of the information you've provided so far in the Problem Background Interview. Please check it for accuracy. If any of the information is wrong, click on that statement to correct it and answer the questions that follow.

- Look for problems I don't know about
- One segment or capture file

220

Problem Background Interview

The application will now proceed to the analysis phase of this session. Before proceeding, it is highly recommended that you read the Recommendations Before Start of Analysis.

Click Here to troubleshoot this problem

Below is a summary of the information you've provided so far in the Problem Background Interview. Please check it for accuracy. If any of the information is wrong, click on that statement to correct it and answer the questions that follow.

- Look for problems I don't know about
- Two or more segments or capture files

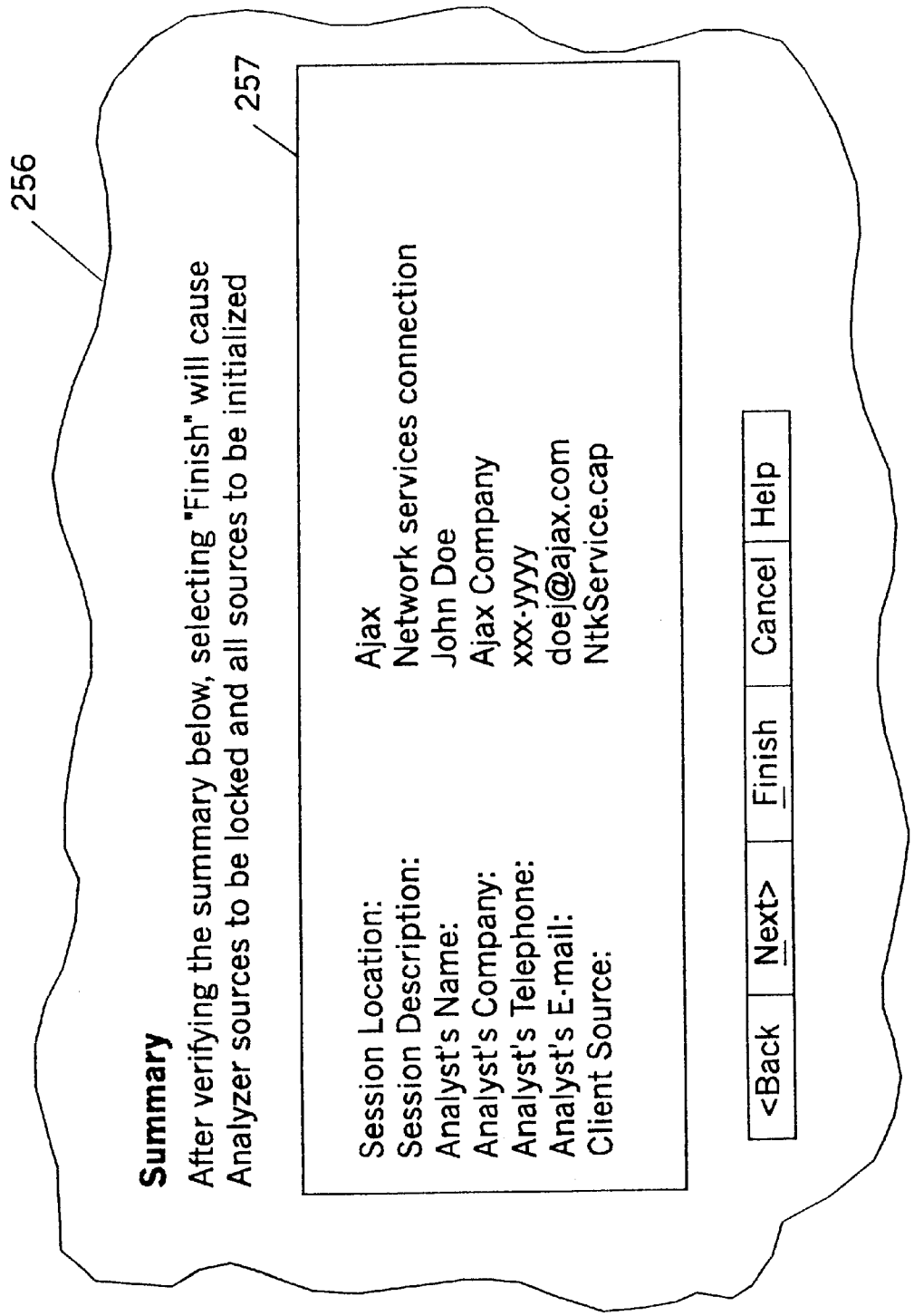

FIG. 20

Results Journal - Feb21(06-19PM)

284

Background

Below lists all of the background information provided to the mentor application up to this point. This information is for reference only and cannot be changed.

Intermittent Failures, Freezes or Hangs
Stations are hanging or freezing
Two or more stations on the same or multiple segments are experiencing th
The hang or freeze does not occur during the use of a specific application
No unique hardware is being used by the station or it has been validated th
A firewall does not separate the station and any resources it accesses
Session Location: Default
Session Description: Feb21(06-19PM)

273

Summary
Background
Breakdown
Major
Minor
Inconclusive
OK
Event Log
Notes
Solution

SCRL

For Help Press F1

FIG. 21

Results Journal - Feb21(06:19PM)

Breakdown

Below is a statistical breakdown of symptoms and events discovered or identified by the Mentor application. Detailed information can be found on Major, Minor, Inconclusive, Okay, and Event Log Tabs of the Results Journal Select Options:
Analysis Source: All Analysis Sources
View Unacknowledged Only: ☑

| Layer | Major | Minor | Inconclusive | Okay | Observed |
|---|---|---|---|---|---|
| Connection/Application | 0 | 0 | 0 | 0 | 1 |
| Network | 0 | 1 | 1 | 0 | 1 |
| Routing | 6 | 0 | 0 | 0 | 0 |
| Data-Link | 0 | 0 | 0 | 0 | 0 |
| Global | 1 | 0 | 0 | 0 | 0 |

| Symptom | Severity | Count |
|---|---|---|
| Server/Router Using Multiple Encapsulations | Major | 6 |
| LAN Broadcast Storm | Major | 1 |
| UDP Checksum Disabled | Minor | 1 |
| ICMP Network Redirect | Observed | 1 |

Summary
Background
Breakdown

Major
Minor
Inconclusive
OK
Event Log
Notes
Solution

For Help Press F1                    SCRL 274
286

FIG. 22

Results Journal - Jun10(10-22PM) — 288

Major Events — 290

| Event | Ack | ? | View | Date/Time | Summary | Description |
|---|---|---|---|---|---|---|
| 1 | ☐ | ? | ⚲ | 6/10/99 09:10:08AM | Server/Router Using Multiple Encapsulations | NetWare Server/Router 00-A Ethernet encapsulations. In g because of excess broadcast |
| 2 | ☐ | ? | ⚲ | 6/10/99 09:10:09AM | Server/Router Using Multiple Encapsulations | NetWare Server/Router 00-A multiple Ethernet encapsulat recommended because of ex |
| 3 | ☐ | ? | ⚲ | 6/10/99 09:10:12AM | Server/Router Using Multiple Encapsulations | NetWare Server/Router 00-A multiple Ethernet encapsulat recommended because of ex |
| 4 | ☐ | ? | ⚲ | 6/10/99 09:10:14AM | Server/Router Using Multiple Encapsulations | NetWare Server/Router 00-A multiple Ethernet encapsulat recommended because of ex |
| 6 | ☐ | ? | ⚲ | 6/10/99 09:10:21AM | Server/Router Using Multiple Encapsulations | NetWare Server/Router 00-A multiple Ethernet encapsulat recommended because of ex |
| 7 | ☐ | ? | ⚲ | 6/10/99 09:10:23AM | Server/Router Using Multiple Encapsulations | NetWare Server/Router 00-A multiple Ethernet encapsulat recommended because of ex |
| 8 | ☐ | ? | ⚲ | 6/10/99 09:10:38AM | LAN Broadcast Storm | 252 broadcast frames on the threshold 250 frames per 5 be an excessive amount of b Because a broadcast packet network, and thus utilizes C |

296 / 298 / 292 / 294 / 300

Summary — 275
Background
Breakdown
Major
Minor
Inconclusive
OK
Event Log
Notes
Solution For Help Press F1

FIG. 23

| Event | Ack | ? | View | Date/Time | Severity | Summary | |
|---|---|---|---|---|---|---|---|
| 1 | ☐ | ? | 🔍 | 6/10/99 09:10:08AM | Major | Server/Router Using Multiple Encapsulations | NetWare Server Ethernet encap because of exc |
| 2 | ☐ | ? | 🔍 | 6/10/99 09:10:09AM | Major | Server/Router Using Multiple Encapsulations | NetWare Server multiple Ethern recommended |
| 3 | ☐ | ? | 🔍 | 6/10/99 09:10:12AM | Major | Server/Router Using Multiple Encapsulations | NetWare Server Ethernet encap because of exc |
| 4 | ☐ | ? | 🔍 | 6/10/99 09:10:14AM | Major | Server/Router Using Multiple Encapsulations | NetWare Server multiple Ethern recommended |
| 5 | ☐ | ? | 🔍 | 6/10/99 09:10:16AM | Observed | ICMP Network Redirect | The router 198 be used for sta 198.85.38.121 198.85.38.121 |
| 6 | ☐ | ? | 🔍 | 6/10/99 09:10:21AM | Major | Server/Router Using Multiple Encapsulations | NetWare Server Ethernet encap because of exc |
| 7 | ☐ | ? | 🔍 | 6/10/99 09:10:23AM | Major | Server/Router Using Multiple Encapsulations | NetWare Server multiple Ethern recommended |
| 8 | | | | 6/10/99 | Major | Lan Broadcast Storm | 252 broadcast |

Summary
Background
Breakdown
Major
Minor
Inconclusive
OK
Event Log
Notes
Solution For Help Press F1

FIG. 24

Results Journal - Jun10(10:22PM)

Notes

This page is provided for any additional notes that you wish to record during your analysis The user was experiencing a brief 1 to 2 second lockup every 30 seconds when he reported the problem to the IT department.

We dispatched a cable tester and verified the cabling was fine. We hooked up the DominoLAN and captured frames off the network for about 2 minutes then fed the file captured into WG Mentor for analysis.

The Segment monitored was segment number B-501.

- Summary
- Background
- Breakdown
- Major
- Minor
- Inconclusive
- OK
- Event Log
- Notes
- Solution For Help Press F1

FIG. 25

Results Journal - Jun10(10-22PM)

Solution

Have you read through the information gathered by WG Mentor (TM) and displayed in earlier pages of the Results Journal?
○ Yes  ⊙ No ← 312

Go through the Major and Minor the Results Journal and look through each symptom and its associated Expert help (?button). Using this information and your own experience, identify a list of possible causes and actions for resolving the problem.

314

[ Click here for help on using Results Journal ] ← 315

Summary
Background
Breakdown
Major
Minor
Inconclusive
OK
Event Log
Notes
Solution

281

310
310A

For Help Press F1

FIG. 26

Results Journal - Jun10(10-22PM)

Solution

Have you read through the information gathered by WG Mentor (TM) and displayed in earlier pages of the Results Journal?
⊙ <u>Y</u>es   ○ <u>N</u>o  ← 312

Have you been able to determine the cause and solution to the problem?
○ <u>Y</u>es   ⊙ <u>N</u>o  ← 316

There are typically other ways to determine the cause and solution of the network problems. WG Mentor (TM) can offer some advice on this topic.

| Click here for further instructions | ← 318 |

| Click here for help on using Results Journal | ← 315 |

Tabs: Summary, Background, Breakdown, Major, Minor, Inconclusive, OK, Event Log, Notes, Solution — 281

310, 310B

For Help Press F1

FIG. 27

Results Journal - Jun10(10:22PM)

Solution

Have you read through the information gathered by WG Mentor (TM) and displayed in earlier pages of the Results Journal?
⊙ Yes  ○ No ← 312

Have you been able to determine the cause and solution to the problem?
⊙ Yes  ○ No ← 316

Record the solution for future reference below:

The Cisco router was misconfigured with invalid routes to other routers. This caused a RIP broadcast storm every 30 seconds which was noticed by the user. Additionally, the excess broadcast traffic generated by the forwarding IPX packets in multiple encapsulations contributed as well to Click here for help on using Results Journal ← 315

Summary
Background
Breakdown
Major
Minor
Inconclusive
OK
Event Log
Notes
Solution — 281

310
310C

For Help Press F1

FIG. 28

| Ethernet | IPX | NetBIOS Novel | | | |
|---|---|---|---|---|---|
| | Abs Time | | Size | Destination | Source | Interpretation |
| 103 | 9:10:10 | 34400 | 245 | Broadcast | DEC B3-9BA-A6 | SAP General Service Response Server |
| 104 | 9:10:10 | 40470 | 114 | Broadcast | Cisto 03-F3-56 | Ethernet D=DEC Lvl 1 Bridges S=Ci |
| 105 | 9:10:10 | 51219 | 114 | Broadcast | Synoptic 07-BB-AA | SNAP OUI=Synoptics Ethertype=0x1 |
| 106 | 9:10:10 | 39062 | 64 | 01-00-81-00-01-01 | Synoptic 07-BB-AA | SNAP OUI=Synoptics Ethertype=0x1 |
| 132 | 9:10:11 | 01085 | 98 | Broadcast | Intel 59-42-F5 | Net BIOS (Novell) Check Name Name |
| 133 | 9:10:11 | 01888 | 101 | Broadcast | PUB <1D | Net BIOS (Novell) Check Name Name |
| 134 | 9:10:11 | 02352 | 64 | Intel 59-44-E0 | WestDig 94-65-0E | NCP C Get Volume Info With Handle |
| 135 | 9:10:11 | 02678 | 84 | West Dig 94-65-0E | Intel 59-44-E0 | NCP R Get Volume Info With Handle |

REAL-TIME ANALYSIS THROUGH CAPTURE BUFFER WITH REAL-TIME HISTORICAL DATA CORRELATION

CROSS REFERENCE TO RELATED APPLICATIONS

Some of the material disclosed and claimed in this application is also disclosed in one or more of the following commonly owned, copending U.S. patent applications: Ser. No 09/342,434 entitled: Rules-Based Expert Analysis System for Networks, filed on even date herewith by Eugene N. Cookmeyer, II, et al.; Ser. No. 09/342,385 entitled: Problem Notebook For Expert Analysis System, filed on even date herewith by Eugene N. Cookmeyer, II, et al.; and Ser. No. 09/342,429 entitled: Expert System Process Flow, filed on even date herewith by Eugene N. Cookmeyer, II, et al.

TECHNICAL FIELD

This invention relates to protocol analysis of signal networks, and more particularly to knowledge based systems for performing such analysis.

BACKGROUND ART

As known, networks represent shared access arrangements in which several network devices, such as computers or workstations (collectively "stations"), are interconnected by a common communications medium to allow users to share computing resources, such as file servers and printers, as well as application software and user work product. The communication medium may be wireline, such as by coaxial, twisted pair, or fiber optic cable, or wireless, such as cellular or radio frequency (RF) transmission. The networks may range from bridged segments of local area networks (LANs) located in a department or single floor of a building, to a wide area network (WAN) of LANs which are geographically distributed and interconnected through switching devices, such as routers or bridges.

Depending on performance requirements, the different LANs within a WAN may have different physical connection configurations (or "topologies"), such as Ethernet or Token Ring. They may also have different vendor proprietary LAN hardware and software with different signal protocols that govern the exchange of information between the stations in the LAN. When these different topology and different protocol LANs are interconnected, which is referred to as "internetworking", there must be an exchange of signal protocols. The Open Standards Interconnect (OSI) seven layer interconnect model developed by the International Organization for Standardization, and which is incorporated by reference herein, describes how information is exchanged between software applications on workstations in different networks by passing the information through a hierarchy of protocol layers.

Networks must be managed to ensure their performance. This includes monitoring signal traffic for trends related to signal volume, routing, and transmission speed to proactively plan for network growth and to avoid signal congestion and network downtime. This also includes detecting and diagnosing network operational problems which affect performance to both prevent problems and to restore network operation with minimum downtime following the detection of a problem. These are the responsibilities of a network administrator, whose network duties require both anticipation of performance changes and diagnosis of performance failures. This requires the availability of network statistics related to performance, and network administrators commonly collect an archive of network management statistics that indicate network utilization, growth and reliability, to facilitate near-term problem isolation and longer-term network planning.

The general categories of statistics monitored include those related to: utilization, performance, availability, and stability within a monitoring period. These may defined as follows:

Utilization statistics relates to network traffic-versus-capacity (i.e. efficiency) and the statistics include frame count, frames-per-second (FPS), the frequency of occurrence of certain protocols, and certain application level statistics;

Performance statistics relate to quality of service issues, such as traffic delays, the number of packet collisions, and the number of message packets dropped;

Availability statistics gauge the accessibility of different OSI protocol layers within the network, and include line availability as percentage of uptime, root availability, and application availability; and Stability statistics describe short term fluctuation in the network which degrade service, including: number of fast line status transitions, number of fast root changes (root flapping, next hop count stability and short term ICM behavior).

Some of these statistics are empirical ("measured statistics") and obtained by counting the occurrence of the selected metric, and others require analysis of actual frame content ("analysis-derived statistics"). Protocol analyzers are the known instruments for providing these measured and analysis-derived statistics.

To be of analytical value the acquired statistical values must be capable of being correlated in a real time composite which quantitatively measures real time network performance. Measured statistics are readily acquired in real time with hardware counters and time stamped counts, which acquire and report the data in real-time. With analysis-derived statistics, however, the network frames are captured in real time but the analysis must necessarily occur in machine time. User selected ("filtered") network frames are real time captured, time-stamped, serially numbered, and stored in a queue for analysis. The frames are then analyzed in machine time and the analysis-derived statistics are reported with their associated frame time-stamp, thereby allowing them to be correlated with the measured statistics.

In the event of "bursty" traffic patterns, the sequenced capture, storage, and analysis is prone to experiencing a back-up resulting from the inability of the process time to keep pace with the rate of frame capture. When this occurs, the capture is halted and network frames are lost until the back-up clears. The lost frames represent lost analytical data. In addition, however, the analyzer has no quantitative measure of the number of frames lost. The result is a loss in data integrity and a corresponding loss in the accuracy of the resulting statistical composite.

DISCLOSURE OF THE INVENTION

One object of the present invention is to provide method and apparatus for acquiring a real time performance history of network signal traffic. Another object of the present invention is to provide method and apparatus for reporting network performance as a real time composite of measured statistics and analysis-derived statistics. Still another object of the present invention is to provide qualification of the real time performance history by accounting for the number and real time of occurrence of each discarded frame in the monitoring session.

According to the present invention, sampled network frames are real time stamped and tagged with a frame number identifying their relative placement in a sequence of acquired frames, the tagged frames are stored as received at available address locations in signal memory to await statistical analysis and the results are stored with their associated time stamp and frame number other address locations in signal memory for ultimate retrieval in providing a real time statistical history of the network's signal traffic in the monitoring session.

In further accord with the present invention, the available address locations in signal memory which are used to store sampled frames are listed as available address locations when not occupied with a monitoring session frame which has not been analyzed, and sample frames received in a period of no available address locations are discarded, counted, and their time stamp recorded and stored in signal memory so as to provide a quantification of the real time occurrence of discarded frames within the reported real time statistical history. In still further accord with the present invention, when a stored sample frame has been analyzed its memory address location in memory is made available for storing a succeeding sampled frame.

In still further accord with the present invention, measured statistics are also acquired and are time stamped with the real time of their occurrence. The measured statistics are stored in association with their real time stamp in signal memory and retrieved in conjunction with any analysis-derived statistics acquired within a monitoring session to provide a real time composite of measured statistics and analysis-derived statistics relating to network performance. In yet still further accord with the present invention, the statistics obtained within a monitoring session, including measured statistics and analysis-derived statistics, are reported in a format which evidences the time of their occurrence, in absolute real time and, alternately, in a relative real time sequence.

The present invention provides an accurate real time composite of a network's performance statistics over a monitoring session. The data, including measured statistics and analysis-derived statistics, either alone or in combination, is presented in the real time sequence in which it occurred. In addition, the data is qualified, as necessary, to account for discarded frames which are also reported in relation to the real time sequence, thereby allowing the analysts-user to similarly qualify the performance indicia.

These and other objects, features, and advantages of the present invention will become more apparent in light of the following detailed description of a best mode embodiment thereof, as illustrated in the accompanying Drawing.

BRIEF DESCRIPTION OF THE DRAWINGS

FIG. 6, is a detailed block diagram of another one of the elements shown in FIG. 4;

FIG. 17, is a figurative illustration of yet another screen display provided by the same FIG. 9 performance element that provided the screen display of FIG. 13;

FIG. 20, is a figurative illustration of another screen display provided by the same FIG. 9 performance element that provided the screen display of FIG. 19;

FIG. 21, is a figurative illustration of yet another screen display provided by the same FIG. 9 performance element that provided the screen display of FIG. 19;

FIG. 22, is a figurative illustration of yet another screen display provided by the same FIG. 9 performance element that provided the screen display of FIG. 19;

FIG. 23, is a figurative illustration of yet another screen display provided by the same FIG. 9 performance element that provided the screen display of FIG. 19;

FIG. 24, is a figurative illustration of yet another screen display provided by the same FIG. 9 performance element that provided the screen display of FIG. 19;

FIG. 25, is a figurative illustration of yet another screen display provided by the same FIG. 9 performance element that provided the screen display of FIG. 19;

FIG. 26, is a figurative illustration of yet another screen display provided by the same FIG. 9 performance element that provided the screen display of FIG. 19;

FIG. 27, is a figurative illustration of yet another screen display provided by the same FIG. 9 performance element that provided the screen display of FIG. 19; and FIG. 28, is an illustration of alternative exemplary tabular data as used in the description of operation of the embodiment of FIG. 2.

BEST MODE FOR CARRYING OUT INVENTION

The present invention relates to a knowledge-based, expert analysis system for providing performance and failure diagnostic analysis of networks, which is colloquially referred to here as the MENTOR[1] expert system. The present expert analysis system is a network troubleshooting tool aimed at the analysis and resolution of LAN and WAN network problems. The system is a hardware and software combination. The software is adapted for installation in a host computer and includes a data acquisition portion and an expert analysis portion. The data acquisition portion is adapted for download from the host computer to a hardware based protocol analyzer, for directing the acquisition of network performance data in the form of analysis-derived network statistics as well as network level measured statistics. The expert analysis system performs a diagnostic assessment of the acquired network performance data.

[1]MENTOR is a trademark of Wavetek, Wandel & Goltermann, Inc.

As described in detail hereinafter, the expert system performs the diagnostic assessment in accordance with an expert analysis algorithm; either as an "on the fly" diagnostic routine on performance data delivered in real time, or in an off-line manner on captured performance data files. As also described hereinafter, the analysis-derived network statistics provided by the expert system's data acquisition portion are real time statistics, which are correlated on the basis of time stamp with the sensed network statistics to provide a composite real time history of the network's performance.

The MENTOR expert system software is adapted for operation on a host computer under a WINDOWS®[2] 95, 98 or NT operating system, using a 32 bit code; preferably in the Microsoft Visual C++ programming language available form the Microsoft Corporation, Redmond, Wash. It is capable of performing real-time expert analysis of LAN (Ethernet, Token Ring 4/16 Mbps), WAN (V-series, and Fast Ethernet. It may also provide off-line expert analysis of WAN (E1, T1, HSSI) and Gigabit Ethernet capture files. It is adapted to provide expert analysis of captured performance data (file data) from different vendor-type protocol analyzer and to perform off-line-protocol analysis, or take live (real-time) data feeds from the DOMINO®[3] family of protocol analyzers and perform real-time, multiple segment analysis on live feeds of TCP/IP, IPX and LLC (Logical Link Control) type 2 protocols on the LAN, and Token Ring and Frame Relay on the WAN.

[2]WINDOWS is a registered trademark of the Microsoft Corporation.
[3]DOMINO is a registered trademark of the Wavetek, Wandel & Goltemann, Inc.

Figure 2:
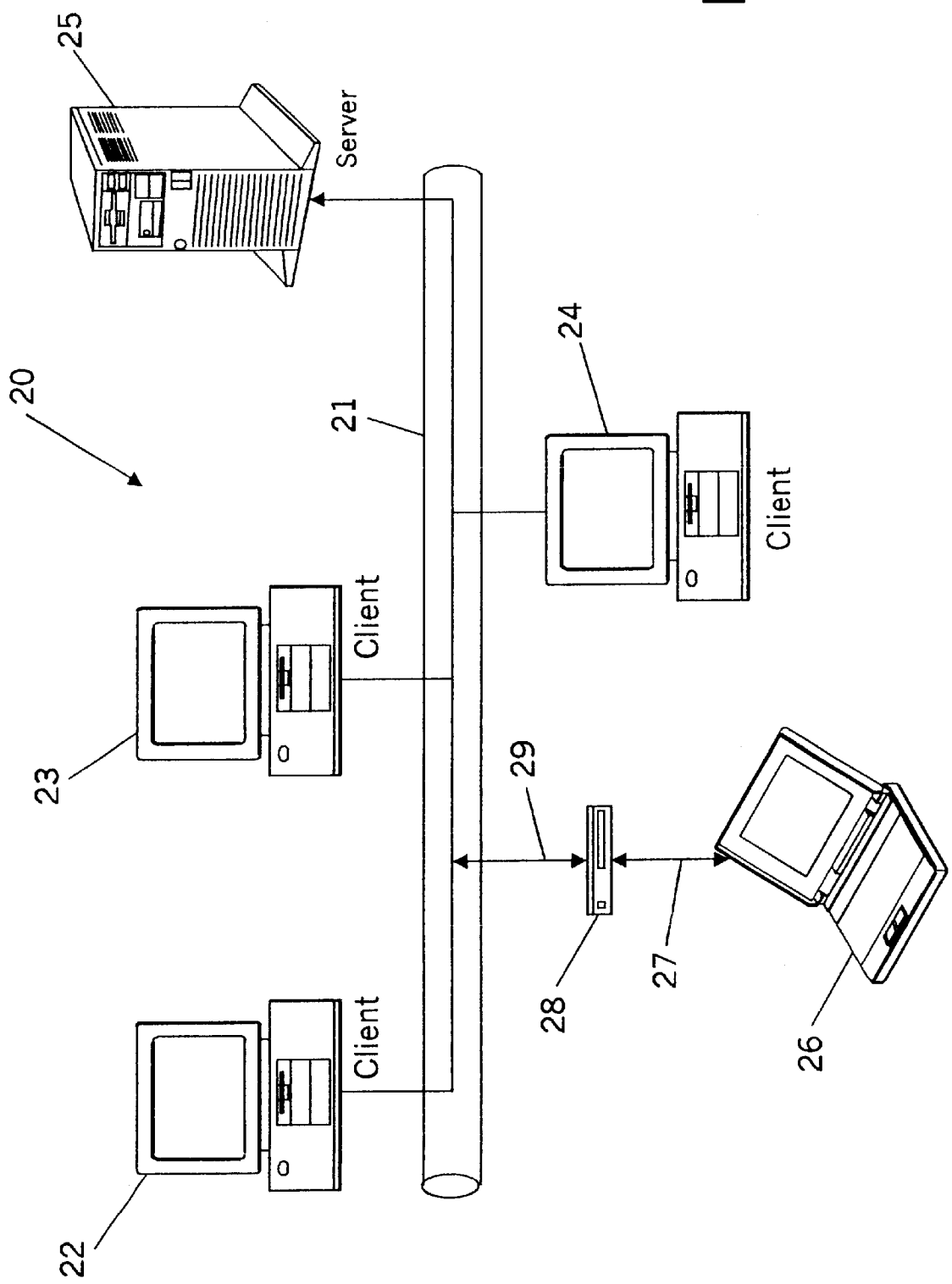
FIG. 2, is a schematic diagram of one embodiment of apparatus in which the present invention may be used to perform the process of FIG. 1.

Referring first to FIG. 2, which is a figurative illustration of a local area network (LAN) 20, having an Ethernet communication medium 21 which interconnects a plurality of workstations 22–24 with a network computer 25, which functions as the network file server. The LAN 20 may be a segment (or subnetwork) of a larger network, and is only intended in this description to illustrate a basic level of application of the expert analysis system of the present invention. The expert analysis system software is installed on a host computer 26. In practice the host computer may be local to, or remote from, the network. For local use, as depicted in FIG. 2, the host computer 26 is connected through its parallel port and cable 27 to a protocol analyzer 28. The protocol analyzer 28 is in turn connected through lines 29 to the network. Alternatively, for a remotely located host computer a Domino Remote Unit may be used (not shown) which acts as an interface for the analyzer in establishing a TCP connection across the network to the host.

Figure 3:
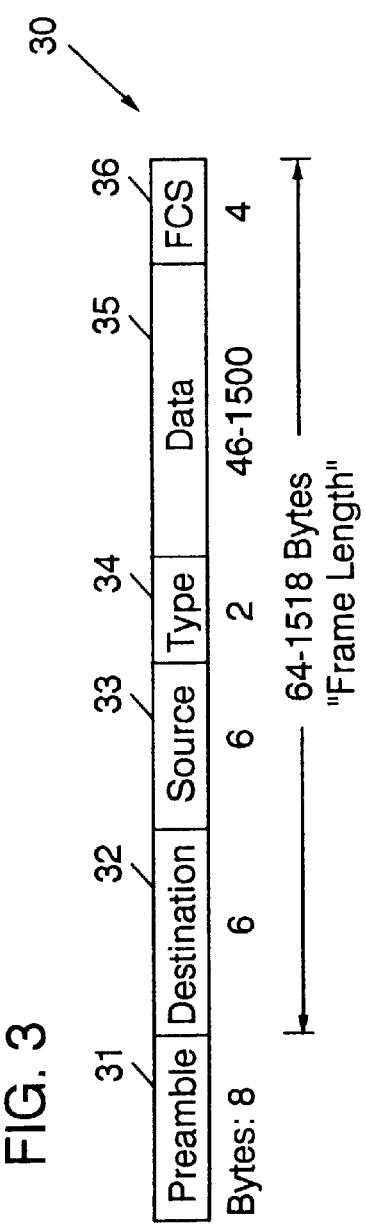
FIG. 3, is an illustration of the field content of a signal frame which is used in the description of the embodiment of FIG. 2.
Figure 7:
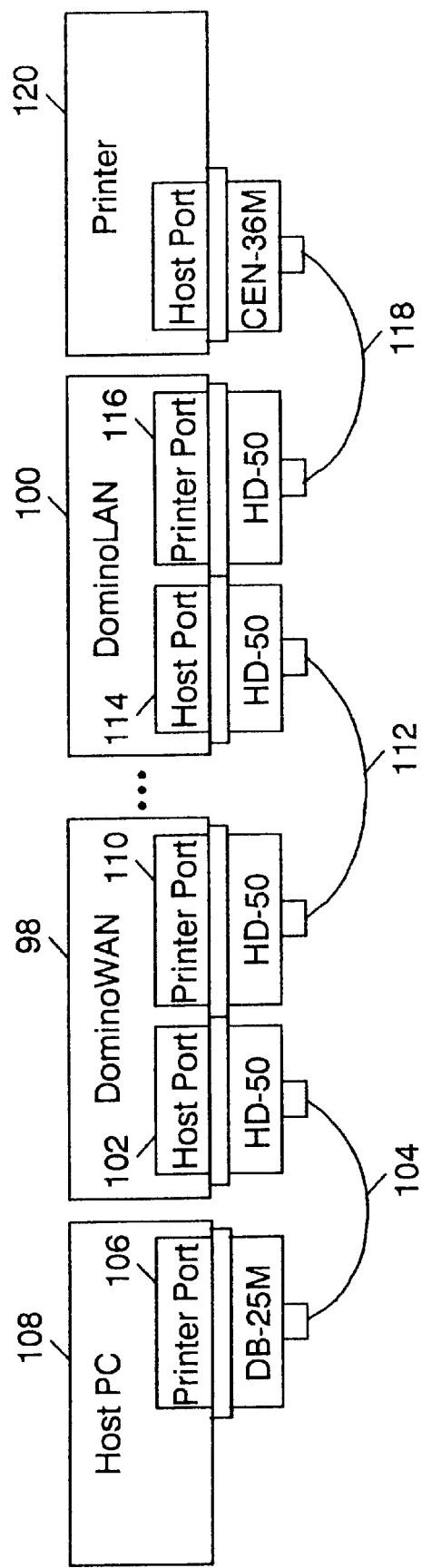
FIG. 7, is a schematic diagram of another embodiment of apparatus in which the present invention may be used to perform the process of FIG. 1.

The network signal traffic between the stations 22–24 and the file server 25 is in framed, serial digital bit format. The frames can be of a fixed or variable length, depending on the number of bits in the data portion. Referring to FIG. 3, a typical Ethernet network frame 30 includes, with respect to increasing time, an eight-byte Preamble field 31, which provides synchronization between stations. Next, Destination and Source address fields 32, 33 contain the Medium Access Control ("MAC") addresses of the destination and source stations, respectively. Each are six bytes in length, and are followed by a two-byte Type field 34 which specifies the OSI (Open Systems Interconnect) layer protocol used in the Data field. The Data field 35, is a variable-length field (from 46 to 1500 bytes) and contains the data as well as the higher level protocols associated with the transmitted data. Last is a four-byte Frame Check Sequence ("FCS") field 36, which is used for error detection. The frame length is the total number of frame bytes, less those of the Preamble.

Figure 4:
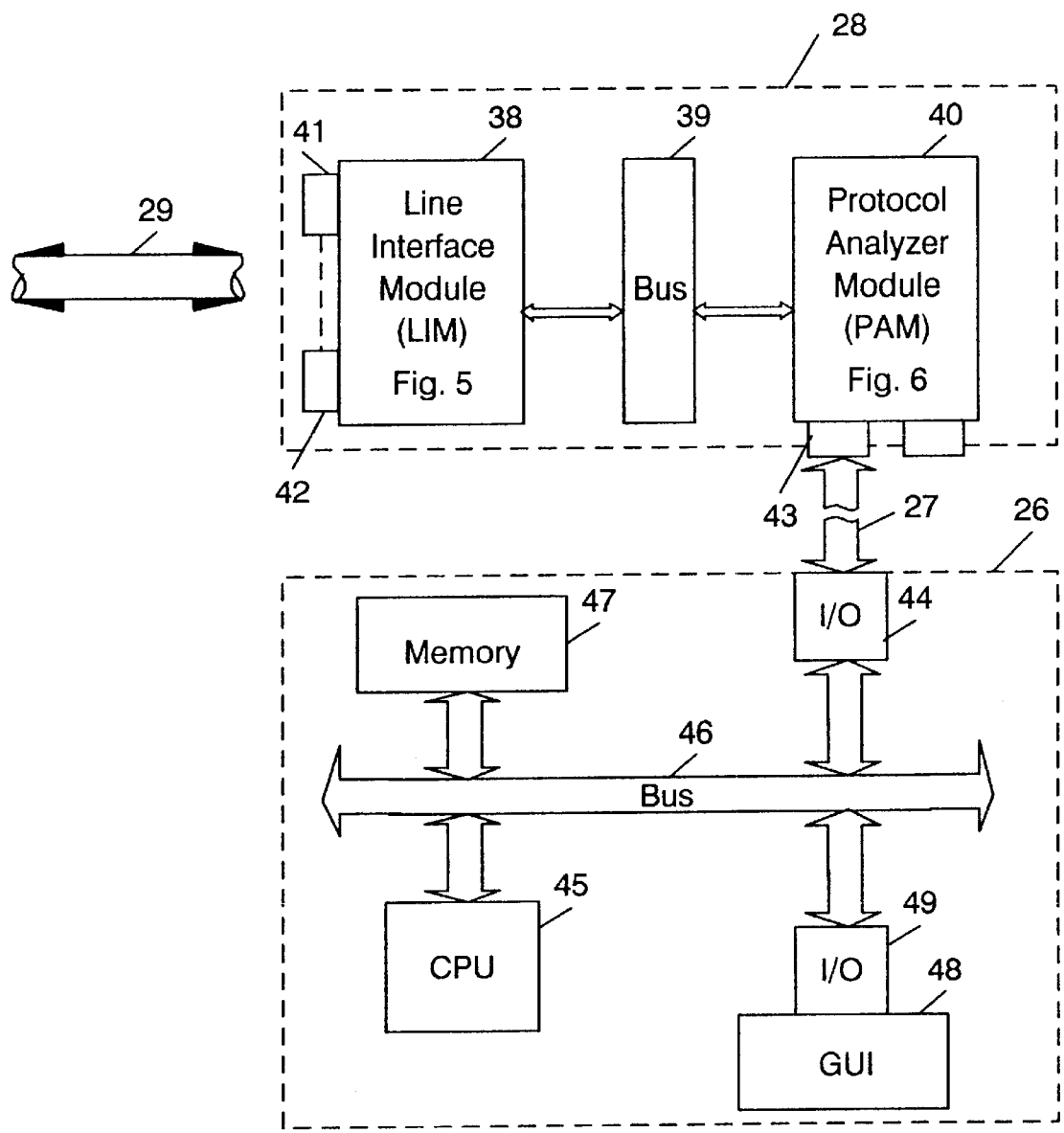
FIG. 4, is a simplified block diagram of elements of the apparatus illustrated in the embodiment of FIG. 2.

In this best mode embodiment the expert analysis system is described in terms of its real time analysis application in which the diagnostic assessment is performed on-line. This gives the expert system the opportunity to command and, or alter the scope and degree of the frames acquired and analyzed in dependence on user entered conditions. These user entered conditions may relate to a network performance parameter of interest, or to an existing network fault condition, as the case may be. These user entered conditions function as boundary conditions for the data to be acquired. To this extent, the functional architecture of the analyzer may be important. A preferred analyzer, therefore, is one of the Domino model protocol analyzers produced by Wavetek, Wandel & Goltermann, Inc. In this description the Domino LAN model analyzer is used. However, as may become obvious in view of the following detailed description of a best mode embodiment, various other model and vendor type analyzers may be used as deemed suitable by those skilled in the art for a given network application Referring to FIG. 4, in block diagram illustrations of the protocol analyzer 28 and host computer 26, the major elements of the analyzer 28 include a line interface module (LIM) 38 which is interconnected through an internal connector 39 to a protocol analyzer module (PAM) 40. The LIM 38 functions as the analyzer's interface to the network under test. To adapt the analyzer to different network topologies (e.g. Ethernet, and Token Ring) the LIM 38 receives the network serial frames from the line 29 through an appropriate one of a plurality of network filters 41, 42; each filter providing the required physical connection to the network topology. As described in detail hereinafter with respect to FIGS. 4, 5 the LIM 38 compiles user selected station and network statistics from all of the received network frames, and passes user selected frames through the internal connector 39 to the PAM 40, which performs and compiles analysis-derived statistics. Ultimately, and in response to a demand from the host computer, the PAM 40 provides a time correlated composite of the network statistical data and analysis-derived statistical data through output connector 43 and lines 27 to the host computer 26

The host computer is a known type computer system, with a known type CPU, such as the PENTIUM[4] model processor manufactured by the Intel Corporation and with a recommended memory size of 32 MB of memory (RAM) total for the expert system software and WINDOWS 95 or 98 operation, or a total of 64 MB RAM if the expert system is used with WINDOWS NT. In the described embodiment the host computer 26 is local to the analyzer, as opposed to being remote, and exchanges information with the protocol analyzer 28 through the lines 27 and its parallel port input/output (I/O) device 44. The I/O device 44 exchanges information between the lines 27 and the computer's central processing unit (CPU) 45 through an internal bus 46.

In operation, the expert analysis system software is installed and resident on the host computer memory 47 where it is accessed through the bus 46 by the CPU 45, the I/O device 44, and by a graphical user interface (GUI) 48 connected through I/O device 49 to the bus. The expert system software includes an interactive, browser-based user interface, and the GUI 48 is a known type which includes means for receiving user (or operator) entered commands, such as a keyboard, mouse, touch screen, or such other equivalent device as may be known to those skilled in the art. The GUI also includes a known type graphics display, which provides the user with a visual display of data and other interactive screen indicia.

Figure 5B:
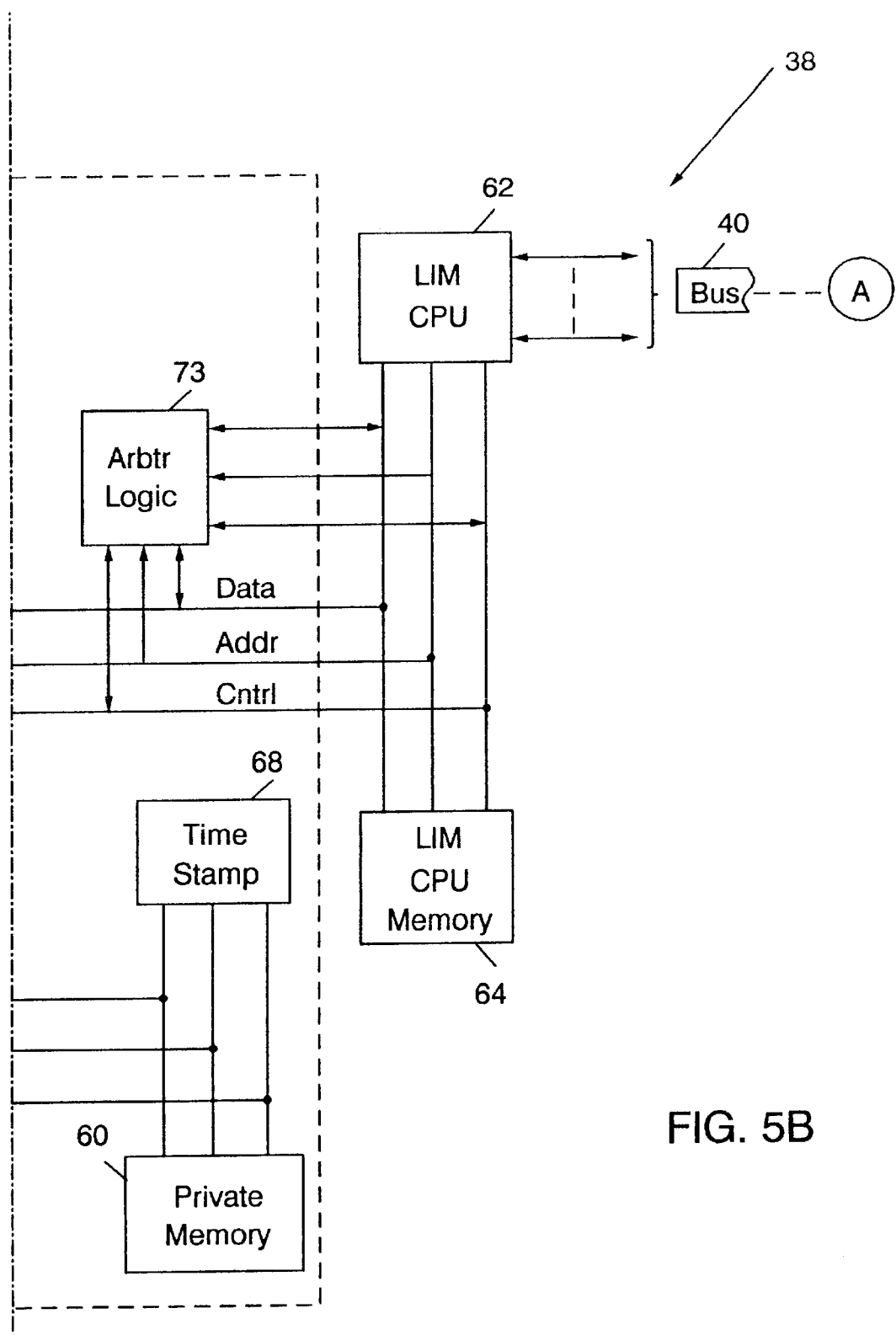
FIG. 5, is a detailed block diagram of one of the elements shown in FIG. 4.

Referring now to FIG. 5, in a system block diagram illustration of the LIM 38, the serial bit network frames are presented through the line 36 and the appropriate one of the network filters 41, 42 to network line interface circuitry 50. In the Domino LAN model analyzer the line interface 50 includes media setup for Ethernet and Token Ring, and provides the physical layer connection for 4/16 Mbps Token Ring or 10 Mbps Ethernet. The Ethernet connection supports the Institute for Electrical and Electronics Engineers (IEEE) standard 802.3 (AUI or 10 Base T) and the Token Ring connection supports the IEEE 802.5 and IBM standards (UTP or STP).

The network line interface 50 forwards the received network frames on serial line 52 to a receive filter 54 and to a multi protocol handler (MPH) 56. The receiver filter 54 is user programmable to provide selectable filter characteristics, and is preferably embodied in hardware. In the best mode embodiment the filter comprises a field programmable gate array (FPGA) in combination with a filter static random access memory (SRAM). The FPGA is preferably configured for promiscuous mode and, as described hereinafter, is subject to an enable/disable command from the LIM signal processor.

The filter SRAM functions as a look-up table which, under control of the LIM signal processor, receives a download of user programmed filter criteria from the host computer 26. In operation, all network frames are received by the FPGA, which presents the source and destination header addresses of each received frame to the SRAM. The SRAM compares the received frame addresses with those stored in the look-up table and if there is a match the SRAM generates a "flush signal" through the FPGA and line 52 to the MPH 56. If the received address does not have a stored match no flush signal is generated.

The MPH 56 functions as a logical first in, first out (FIFO) buffer of programmable size, which acts as an entry pipeline for the received frames to the analyzer. The flush signal from the filter SRAM functions as a reject command, such that in response to the appearance of a flush signal the MPH 56 discards the received frame. Alternatively, in the absence of a flush signal the frame is ultimately passed to the analyzer's capture RAM for storage as a "to be analyzed", or "captured network frame". In the Domino LAN analyzer the flush signal must appear from the SRAM within a preset number of received bytes; typically the first 60 bytes, after which the MPH 56 ignores the filter criteria. This allows frames to pass to the capture RAM in the event of doubt and provides further assurance of the integrity of the analyzed statistical data.

The MPH 56 is under the control of a communications processor 58 that connects directly to the MPH 56, and runs at a clock speed of 16 MHz. The communications processor 58 executes code stored in a private memory 60, which it accesses through the MPH 56. The executed code is downloaded at system power-up through the analyzer 35 to the private memory 60 from the host computer, as part of the downloaded data acquisition portion of the expert analysis software.

The communications processor (CP) 58 writes each of the captured network frames from the MPH 56 to a mapped frame handler area in the private memory 60. As described hereinafter, the mapped frame handler area functions as a waiting station for the filtered network frames pending their transfer by the LIM signal processor 62 to the analyzer's capture RAM 64. The mapped frame handler area includes both "frame reception handler" and "frame transmission handler" portions. Just as the frame reception handler portion is designated as temporary storage area for received network frames, the frame transmission handler portion functions as a holding area for test frames that are to be inserted through the MPH 56, the line 66, a transmit filter 67, and the network line interface 50, onto the network for simulated testing of network performance or throughput capacity.

Each of the network frames received by the line interface circuitry 50 is marked with a frame number and a time stamp which are stored with each captured frame stored in the frame reception handler portion of the private memory 60. The time stamp is provided by a time stamp counter 68, which provides a 32 bit count with 32 microsecond resolution, which is programmable through the communications processor (CP) 58.

The private memory 60 also includes a separate mapped area for storing sensed statistical information provided by a plurality of hardware counters 70–72 which are associated with the network line interface 50 and filter 54. The hardware counters register the occurrence of user selected network level events in the network frames received from the interface 50 and filter 54 over the course of the network monitoring session. The statistics monitored are selectable, however, commonly monitored statistics include total frame count, total byte count, and the number of flushed (or "filtered-out") frames. The CP 58 reads the current count value of the hardware counters 70–72 at each interval of the time stamp counter 68 and stores the two values in relative association in the mapped statistical area in the memory 60.

In the LIM 38, the line interface 50, filter 54, MPH 56, memory 60, time stamp counter 68, and hardware counters 70–72 are all under control of the communications processor 58 in performing the task of acquiring sensed statistical data, as well as acquiring the filter selected network frames from which the PAM 40 provides the analysis-derived statistics. For the purposes of this description they are collectively referred to as a data acquisition unit 73.

The data acquisition unit 73 must acquire the network frames as they appear, in real time and with limited signal storage capacity in the MPH 56 and memory 60. It must, therefore, limit the storage time of the captured frames in the frame reception handler in memory 60 to avoid a "processing backup". Network frames appearing in the presence of a data acquisition unit backup cannot be captured and are lost. In the prior art, a lost frame represented a compound loss in the integrity of the analysis since not only was the quantitative data missing from the lost frame, but also the fact that a frame was lost and not otherwise counted. This inability to quantify lost frames results in an inability to qualify the resulting diagnostics.

In the Domino LAN model protocol analyzer the LIM signal processor 62 is a transputer, i.e. a parallel processing computer with multiple instruction streams and multiple data streams; referred to as MIME. The model type is an INMOS T425 manufactured by SGS Thompson Corporation, INMOS Ltd., 1000 Aztec West, Alnondsbury, Bristol, BS12 4SQ UK. The transputer is a 32 bit machine with an operating speed on the order of 25 MHz. As do all transputers, the LIM signal processor 62 has multiple serial links giving it the capability to talk to several other transputers in a near simultaneous manner. In the Domino LAN analyzer embodiment this multiple serial link feature is used by the LIM transputer signal processor 62 to exchange signal information over a pair of serial links with a comparable transputer signal processor for the PAM 40, as described hereinafter with respect to FIG. 5. These dual serial links are included in the analyzer internal connector 39, which interconnects the LIM 38 and PAM 40.

The LIM signal processor 62 functions as a gateway for all information exchanged between the LIM and the PAM 40. That portion of the expert system software which is installed in the analyzer is downloaded at power-up to the PAM signal processor. Those elements of the expert system software to be installed in the LIM, such as the filters 54, 67, memory 60, counters 70–72, are forwarded by the PAM signal processor to the LIM signal processor 62 which executes the installation of the software in these elements. The signal processor 62 also functions as the master in a master-slave relationship with the CP 58 and other elements of the data acquisition unit 73, including the memory 60. Arbitration logic 74, implemented in a combination of FPGAs, arbitrates the processor's access to the data acquisition unit.

The network frames momentarily held in the mapped frame reception handler area of the memory 60 are accessed by the processor 62 through the MPH 56 and transferred to the analyzer's capture RAM 64. In a best mode embodiment, which utilizes the MIMD characteristics of the transputer model signal processor 62, the frame reception handler area is mapped in two sub-portions, arbitrarily referred to as "Frame Reception Handler A" and "Frame reception Handler B". The CP 58, when storing the network frames in the frame reception handler, alternates the storing of succeeding numbered network frames (as numbered by the line interface 50) in the A and B sub-portions. The sorted frames are then retrieved by the transputer processor 62 in the same A, B alternating pattern, and stored in the capture RAM 64.

FIG. 6 is a system block diagram of the PAM 40, which includes a PAM signal processor 75 that exchanges information with the LIM signal processor 62 over the analyzer internal connector 39. As described hereinbefore, in a best mode embodiment the LIM and PAM signal processors are the same model type processor, specifically a transputer model type, with reduced instruction set architecture to provide the processing speed required by the analyzer. It should be understood, however, that such other model type processors may be used as deemed suitable by those skilled in the art for providing suitable similar performance of the expert analysis system functions. Such other model processors include the Intel model 960 processor manufactured by the Intel Corporation, Santa Clara, Calif. and the PowerPC processor manufactured by Motorola, Inc., Phoenix, Ariz.

The PAM signal processor 75 includes a PAM signal memory 76, preferably of a dynamic RAM (DRAM) type. In a best mode embodiment the memory 76 includes a fixed memory 78, nominally 4 M bytes (1 M×32 bit), and a DRAM expansion 80 capable of expanding the capacity of the signal memory 76; preferably by an additional 20 M bytes (5 M×32 bits). The memory is used to store the analysis-derived statistics which are written to memory by the PAM processor 75 during analysis of the captured network frames. The statistics are retrieved from memory by the processor on command of the host computer 26 (FIG. 2) and forwarded to the host. Access to the memory 765 by the processor may be in byte, word (2 byte), or double word (32 bit) segments.

Communication between the host computer 26 (FIG. 2) and the analyzer 35 (FIG. 2) is through a serial to parallel port interface 82 to the PAM signal processor 75. The parallel port interface 82 includes a "serial transputer link to parallel port C012 adapter" 84, which complies with the ISA (Industry Standard Architecture) parallel-port standard, and an interface controller 86. The adapter 84 and interface controller 86 are preferably application specific integrated circuits (ASICs) which, in combination with a programmable logic device (PLD) 88 and signal memory 90, regenerate the host computer's 8 bit ISA bus with parallel-port signals and appropriate software drivers. The ISA parallel port signals are provided by the interface 82 to the analyzer connector 43, and through lines 27 to the host computer 26.

In applications where the expert system must perform internetwork analysis, such as between bridged network segments, or as between different networks connected through routers in a wide area network (WAN) environment, several analyzers may be used to provide coordinated data acquisition and analysis under supervision of the expert system software installed in the host computer. If proximity permits, the analyzers may be interconnected, in a parallel arrangement, back to the host computer. The PAM 40 provides this interconnection capability through an output "printer port" 92, which is connected in parallel with the "host port" 43, at the output of the parallel port interface 82. Clock signals from the PAM clock generator 93 are presented through multiplexer (MUX) circuitry 94 to the printer port 92, which provides synchronized clock and time stamp signals to a printer or other connected analyzers. The MUX 94 is under control of the PAM signal processor 75 through a programmable logic device (PLD) 96.

FIG. 6 illustrates one such interconnect arrangement for analyzers 98, 100. The first, or "lead" analyzer 98 is connected through its host port connector 102 and cable 104 to the parallel port 106 of a host computer 108. The printer port 110 of analyzer 98 is connected through a cable 112 to the host (PC) port 114 of analyzer 100 which, in turn, is connected at its printer connector 116, though cable 118 to a printer 120. The interconnect cables 104, 112, and 118 carry clock and time stamp signals from the lead analyzer 98, as well as all communications between the connected devices and the host computer.

Figure 1B:
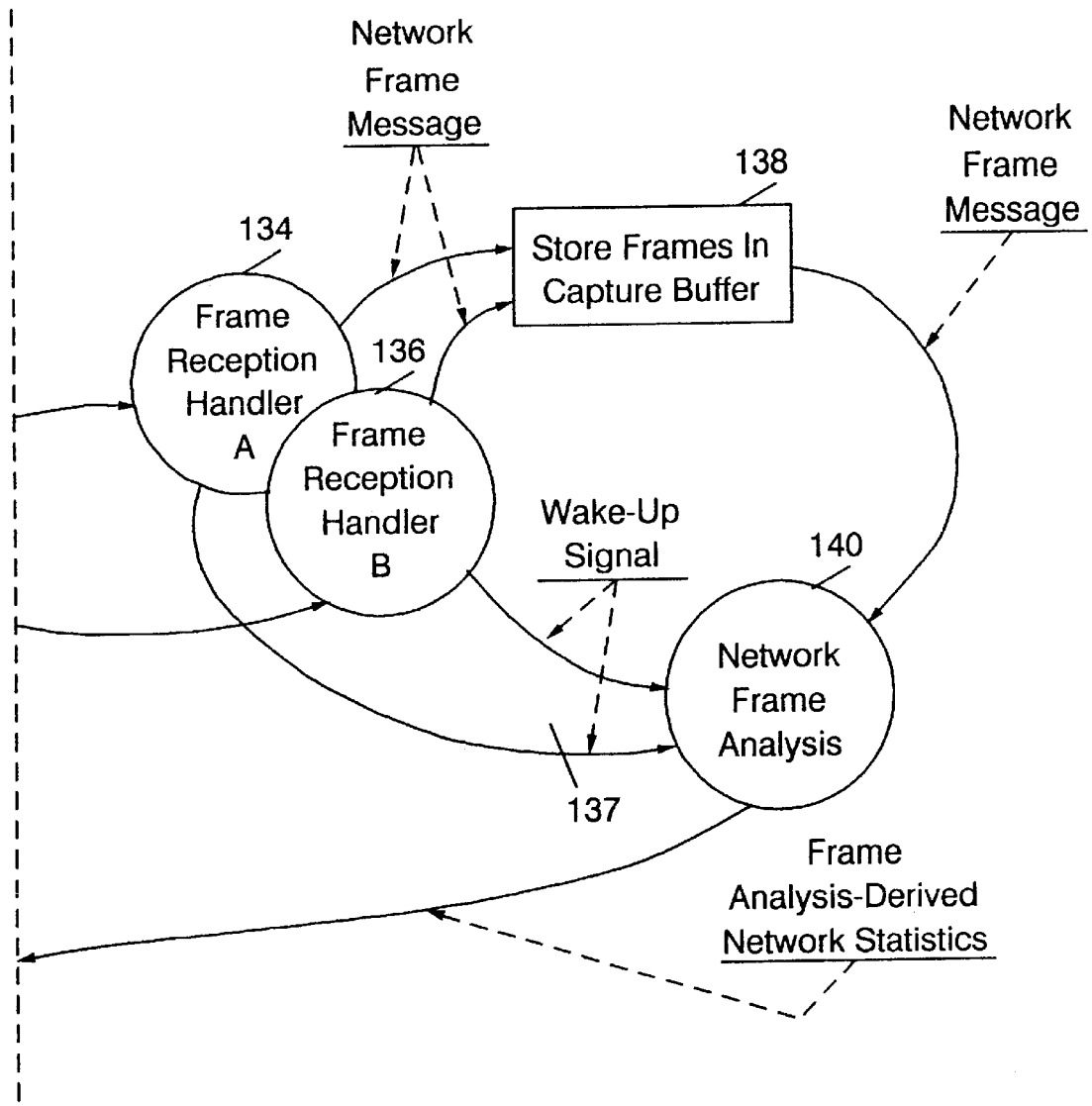
FIG. 1, is a process flow diagram of the present invention.

In operation, the expert analysis system uses a real-time analyze through capture buffer technology to ensure that performance of the analysis is not limited to how quickly the PAM signal processor 75 can handle real-time reception and analysis of captured network frames. Referring to FIG. 1, which is a flow diagram of the present capture and analyze process performed by the analyzer 35 (FIG. 2) under control of the expert system software. The network frames are received at step 122 by the LIM line interface 50 (FIG. 5), which tags each frame with a high resolution time stamp 124 and a sequenced frame number 126. Step 128 obtains user selected measured statistics with counters 70–72 (FIG. 5). Step 130 filters the addresses of each received frame with filter 54 (FIG. 5), and network frames which pass the user programmed filter criteria are captured in step 132 by storing the filtered frames.

In the Domino LAN model analyzer the captured frames are relayed from the LIM to the PAM over the two serial links (within the internal connector 39) between the LIM and PAM transputer processors. In this process the LIM transputer 62 alternates the transmission of succeeding numbered frames over both links, such that each link nominally carries "every other" numbered frame. To facilitate this dual link, alternating frame number transmission, the captured frames are stored by the communications processor 58, (FIG. 5) in a similar alternating fashion in two different frame reception handler areas (A and B) mapped in the host memory 64. This is illustrated in the flow process diagram of FIG. 1 by the steps 134, 136. The PAM processor 75 is provided with wake-up signals 137 upon each transfer of a captured frame to the capture RAM.

The frames remain in the frame handler locations only for the time necessary for them to be queued for retrieval by the LIM transputer 62 and sent across their associated link to the PAM transputer 75, which stores them directly in the RAM capture buffer mapped in the memory PAM 76, as shown with step 138. The frames are stored in the capture buffer without re-sequencing them based on frame number, thereby eliminating an overhead step in the preprocessing flow. However, the PAM processor does maintain a pointer which tracks the "next to be analyzed" frame stored in memory. The frames are then retrieved from memory by the PAM processor (75, FIG. 6) to perform the frame analysis in step 140 and in step 142 the processor stores the derived statistical data in the "history statistics" buffer which, in a best mode embodiment, is also mapped in the PAM memory 76.

Each derived statistic remains tagged with its parent frame number and time stamp, such that they may be correlated on the basis of the real time stamp with the time stamped measured statistics which are periodically written to the history statistics buffer by the LIM processor (62, FIG. 5) in step 144, from the line interface statistics handler. This, therefore, provides an accurate real time correlation of all of the statistics acquired within a monitoring session. In normal operation the frames that are analyzed remain in the capture buffer and are overwritten by succeeding captured frames. In the event that the frame capture rate exceeds the available memory storage the most recently captured frame will be discarded, and a "Discarded Frame Counter" in the PAM processor increments a Lost Frame count. This count value, together with the preservation of the frame number with each derived statistic allows for a quantitative determination of the number and the "placement" of the lost frames in the real time composite, thereby qualifying the composite data where necessary, but maintaining its integrity.

It should be pointed out, however, that the reduced processing time provided by elimination of the step of re-sequencing the stored captured frames prior to analysis minimizes the occurrence of a back-up, thereby also providing a high integrity frame capture capability. In summary, therefore, a valuable aspect of the present expert analysis system is in its accurate correlation of the analysis-derived statistics with the sensed real time network statistics to provide a real time composite history of network performance. This correlation is made possible by the improved management of the frame capture process which: (i) alters the process flow to minimize, if not eliminate, processing back-ups which result in the missed capture of network frames, and (ii) to the extent that processing back-ups do occur the process makes controlled drops of RAM stored frames.

Figure 8:
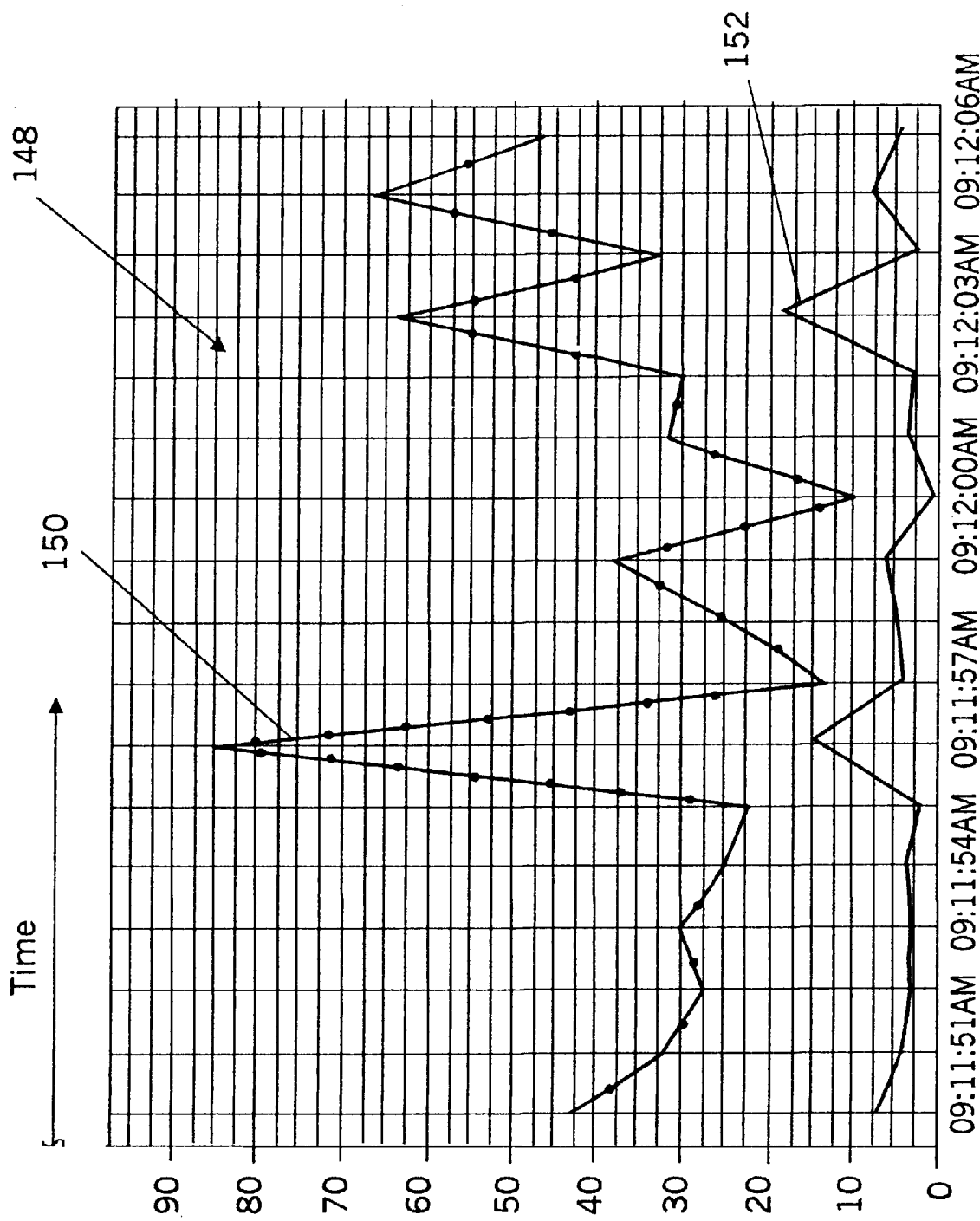
FIG. 8, is an illustration of exemplary tabular data as used in the description of operation of the embodiment of FIG. 2.

FIG. 8 is an illustration of a displayed real time statistics composite 148 as may be provided by the system. The displayed composite is in graphical form, but as understood by those skilled in the art there are various other elective display formats, including tabular, as shown hereinafter in FIG. 28. Similary, the composite is of two selected statistics relating to the number of sample frames 150 and bytes analyzed 152, but various other ones of the acquired statistics may be selected for display, either alone or in multi-metric combinations Rules-Based Analysis The system's acquired network data is analyzed using a knowledge base comprising a hierarchy of rules-based algorithms. The hierarchy is established in a tree architecture; each rule being interdependent in a prioritized arrangement with one or more other rules. While the rules interdependencies are fixed the individual rule priorities are adaptable based on the objective of the particular analysis, which may be baselining or diagnosis of a particular network problem. This is a novel feature of the present system in that the rules to be used for a given analysis are defined at run time. Instead of a knowledge base which is fixed by a pre-program to detect the occurrence of pre-selected events, using fixed thresholds, the expert algorithms used in the present invention are adaptable for each given situation based on the information entered by the user at the time of application.

A master prioritization is pre-programmed as a default condition, but the default is modifiable in dependence on the information entered by the user. As described hereinafter, the expert system includes four distinct phases, the first two of which allow the user to enter information regarding the nature of the analysis, including specific problem conditions. The default priority is then automatically modified in dependence on the characteristics of a user stated problem. The results of this novel approach is the following:
1. New events and symptoms can be created at run-time instead of at system design time.
2. New events and symptoms can be based off of other events occurring or not occurring, allowing for event correlation to be supported by developing rules based on the events to be correlated.
3. By allowing the text of a rule to be specified at run-time, further instructions can be given to users in the troubleshooting process that can provide additional assistance to them during the problem analysis.

Rules-Based Extension to Network Analyzer Expert Events

In the present expert analysis system rules engine the rules in the set each have the following characteristics:
(a.) a unique rule identifier to differentiate one defined rule from the other;
(b.) the frequency at which the rule will be evaluated, in seconds, which is adjustable based on user stated network conditions, or by direct override by the user, where−1 indicates the end of the rule's analysis based either on satisfaction of the rule' stated condition or due to a change in the required analysis based on stated network conditions;
(c.) the priority of the rule in relation to other rules to indicate which rule will be evaluated first;
(d.) the status of the rule as to whether it is enabled, disabled, or has fired;
and (e.) Boolean operators related to the terms in the rule (AND all terms together or OR all terms together).

As understood by those skilled in the art the above rule characteristics are fundamental to the ordered execution of the knowledge base, but that various modifications may be made in the characteristics without altering their function or purpose.

In operation, the actions taken by the rules based algorithm once a rule "fires", i.e. once satisfaction of the rule occurs, includes:

(a.) logging the event (with summarized and detailed information about the event and the Help file code) indicating a status level at which the rule observed event should be logged, such as "OK", "Inconclusive", "Major", "Minor" or "Observed";

(b.) resetting the "fired" status of the rule, including any subordinate dependency rules which may also require resetting;

(c.) depending on the objective of the analysis, determining if the rule should remain enabled or should be disabled, including the continued enablement or disablement of any subordinate dependency rules;

(d.) running, if required, one or more EXE files which were dependent on the occurrence of the firing of the rule (identify which EXE to run)—the "logging an event" function must be also selected; and (e.) triggering the Analysis to Stop—logging an event must be also selected A set of terms identifying the conditions of the rule including the following:

(a.) checking whether another rule has fired;

(b.) checking whether an event/symptom (from the standard expert events) has occurred. Event/symptoms in the system can also be tied to specific conditions including network addresses giving resolution into the specificity of an event to a problem being analyzed; and (c.) checking the value of a statistic against another value The following is the logic of the Rules-Engine that evaluates these rules.

1. Every second, each rule is checked as to whether it should be evaluated. This is done by decrementing a frequency work counter and when it hits zero, the rule needs to be evaluated.
2. If a rule should be evaluated, the terms of the rule are checked and the Boolean operators that apply to all the terms are evaluated. The number of terms in a given rule is variable, based on user input.
3. If the rule passes, the following occurs:

(a.) the rule's FIRED indicator is set, for the consideration of any other dependent rules;

(b.) if an event is to be logged, the rule unique identifier is sent up to the event queue;

(c.) if the rule's FIRED status is to be reset, the rule information is located based on the unique identifier and the FIRED indicator cleared;

(d.) if a rule is to be enabled or disabled, the rule information is located based on the unique identifier and the ENABLED indicator is set or cleared;

(e.) if an EXE is to be run, this indicator is sent to the event queue and the user-configured EXE is run (the EXE is uploaded and run in the host computer (26, FIGS. 3,4); and (f.) if the analysis is to be triggered, the analysis is stopped ("stop analysis with this frame") and this indicator is sent to the event queue.

Heuristic Algorithms

The above described hierarchy of rules also includes a plurality of heuristic algorithms, which are performed by the PAM signal processor 75 and/or the host computer 26 as a background process to the real-time capture and analysis of the network frames. As may be understood from the following description, each of the algorithms have common characteristics in that each have the ability, on the basis of monitoring related events, to conclude the presence of a network event. Of course the events differ in their detailed steps, as do the characteristics of the assigned event that they monitor. Their conclusions are inferential of the occurrence of their monitored event, and may be predicative if the algorithm's boundary conditions are quantitative (as opposed to qualitative). The present expert analysis system uses these inferences in two ways: as an individual reported network events, and as an observed condition in a diagnostic analysis performed on a network problem.

Following, is a description of each of the algorithms.

Detection of Suspected IP Routing Loop Events

Since the expert analysis system views the network under test from the perspective of one, or more segments (in the event that more than one protocol analyzer is being used) it must determine the existence of a suspected IP routing loop by examination of the header information of captured frames received from a source outside of the analyzed segment. In this IP Routing Loop Event algorithm the metric observed is the number and degree of the changes which occur in the time to live (TTL) value in the IP header of frames received from an IP station.

The algorithm's antecedent steps to performance of its monitoring and evaluation, include:

1. establishing and storing in memory, a configurable, TTL reference threshold file value which may be identified as "Number of Decreases in IP TTL to Consider as IP Routing Loop"; and
2. selecting and entering into the configurable file, a value representative of a user elected, tolerable number of changes in the IP time to live (TTL) value of successive frames received from an IP station, which value may be changed thereafter, as deemed necessary by the user.

The algorithm's monitoring and evaluation steps thereafter include:

1. obtaining the current value of the configurable threshold, "Number of Decreases in IP TTL to Consider as IP Routing-Loop";
2. creating statistics table records for each source IP station from which frames are received in a monitoring period, beginning with the first received frame, the records being relatively described as "TTL/Hops from Station" (which is initialized to the TTL field value in the IP header of the first received frame) and "Number of times TTL has changed" (which is initialized to zero);
3. comparing the value of the TTL field in the IP header for each succeeding frame received from each source IP station with the "TTL/Hops from Station" value entered in the statistics record for that source station, and if the value is less than that recorded, incrementing the "Number of times TTL has changed" entry;
4. concluding that an IP Routing Loop Event has occurred if the "Number of times TTL has changed" entry is greater than the current value of the "Number of Decreases in IP TTL to Consider as IP Routing Loop"; and
5. providing information about the occurrence of the event, including the frame number and IP address of the station involved in the suspected routing loop, to the expert system event cache.

This algorithm determines that a station $ADDRESS1 has exceeded the selected threshold for the number of allowed decreases in IP Time-To-Live. Once the event has been detected the system infers a number of possible causes for the event and recommends actions to be taken to correct the problems.

Examples include:

(1) Possible Cause—There may be two routers misconfigured that end up routing traffic between themselves.

Recommendation—you should be able to pinpoint the two data-link addresses communicating the routed traffic.

(2) Possible Cause—A bridge may not be running the Bridge Spanning Tree Protocol, causing a bridging loop. Someone may have switched this protocol off or it may never have been turned on.

Recommendation—Make sure that this protocol is turned on for all bridges.

(3) Possible Cause—A repeater, switch, or hub may be incorrectly cascaded to another repeater, switch, or hub causing, the loop at the data-link layer.

Recommendation—Starting with any recent physical network changes, seek out the data-link layer loop and correct it.:

(4) Possible Cause—A router may have two connections to the same switch and may be forwarding broadcast packets out of both of its interfaces, causing a routing loop within the same router.

Recommendation—Verify that all routers are connected independent switched LAN's. Remember simply plugging one switch into another can instantly cause a routing loop.

Detection of Suspected IPX Routing Loop Events

In this IP Routing Loop Event algorithm the metric observed is the number and degree of the changes which occur in the IPX Hop Count value in the IP header of frames received from an IP station.

The algorithm's antecedent steps to performance of its monitoring and evaluation, include:

1. establishing and storing in memory, a configurable, Hop Count reference threshold file which may be identified as "Number of Increases in IPX Hop Count to Consider as IPX Routing Loop"; and
2. selecting and entering into the configurable file, a value representative of a user elected, tolerable number of increases in the hop count value of successive frames received from an IP station, which value may be changed thereafter, as deemed necessary by the user.

The algorithm's monitoring and evaluation steps thereafter include:

1. obtaining the current value of the configurable threshold, "Number of Increases in IPX Hop Count to Consider as an IPX Routing Loop";
2. creating statistics table records for each source IP station from which frames are received in a monitoring period, beginning with the first received frame, the records being relatively described as "TTL/Hops from Station" (which is initialized to the TTL field value in the IP header of the first received frame) and "Number of times TTL has changed" (which is initialized to zero);
3. comparing the value of the Hop Count field in the IP header for each succeeding frame received from each source IPX station with the "TTL/Hops from Station" value entered in the statistics record for that source station, and if the value is greater than that recorded, incrementing the "Number of times Hop Count has changed" entry;
4. concluding that an IPX Routing Loop Event has occurred if the "Number of times TTL has changed" entry is greater than the current value of the "Number of Increases in IPX Hop Count to Consider as an IPX Routing Loop"; and
5. storing information regarding the occurrence of the event, including the frame number and IPX address of the station involved in the suspected routing loop, to the expert system event cache.

This algorithm determines that a station $ADDRESS1 has exceeded the selected threshold for the number of allowed decreases in IPX Hop Count. Once the event has been detected the system infers a number of possible causes for the event and recommends actions to be taken to correct the problems.

Examples include:

(1)-Possible Cause—There may be two routers misconfigured that end up routing traffic between themselves.

Recommendation—If it is routed traffic, you should be able to pinpoint the two data-link addresses communicating the routed traffic.

(2) Possible Cause—A bridge may not be running the Bridge Spanning Tree Protocol, causing a bridging loop. Someone may have switched this protocol off, or it may never have been turned on.

Recommendation -Make sure that this protocol is turned on for all bridges.

(3) Possible Cause—A repeater, switch, or hub may be incorrectly cascaded to another repeater, switch, or hub, causing the loop at the data-link layer.

Recommendation—Starting with any recent physical network changes, seek out the data-link layer loop and correct it.

(4) Possible Cause—A router may have two connections to the switch and may be forwarding broadcast packets out of both of its interfaces causing a routing loop within the same router.

Recommendation—Verify that all routers are connecting independent switched LAN's. Remember that simply plugging one switch into another can instantly cause a routing loop.

Detect Duplicate MAC Addresses on Separate Source-Routed Segments

As known the "Data Link" layer (alt. "link layer"), which is layer 2 of the Open Systems Interconnect (OSI) reference network model is subdivided by the Institute for Electrical and Electronics Engineers (IEEE) 802.2 specification, into Media Access Control (MAC) and Logical Link Control (LLC) sublayers. The defined MAC addressing protocol allows the devices that access a network's physical medium to be uniquely identified. This algorithm detects the presence of duplicate MAC address, as follows:

1. For the first frame containing an IEEE 802.2 header received from a Locally Administered MAC address, create a statistics table entry for the source MAC address and initialize the value of the "Source Ring Number" field to that of the source ring in the source-route header of the frame. If no source route header exists in the frame, initialize the value of the field to be FFFD hexadecimal (which does not represent a valid source ring number) to indicate that the station is on the current ring segment;
2. For each subsequent frame containing an IEEE 802.2 header and the same Locally Administered MAC source address, check to see if the source ring in the source-route header matches that of the value stored in the "Source Ring Number" field of the station's source address;
3. If the "Source Ring Number" does not match the source ring in the source-route header, the event has been detected; and 4. Pass information about the event including the frame number and MAC address of the station involved up to the expert event cache;

This algorithm determines that the same MAC address $STATION has been seen existing on source routed segments, $SEGMENT1, $SEGMENT2, and $SEGMENT3. Once the event has been detected the system infers a number of possible causes for the event and recommends actions to be taken to correct the problems.

Examples include:

(1) Possible Cause—The configuration of the station was copied from another station that is using a locally administered address.

Recommendation—Change the network address on one of the two station.

(2) Possible Cause—A user has accidentally configured the wrong locally-administered address.

Recommendation—Change the network address on the user's station.

(3) Possible Cause—In the SNA environments, sometimes IBM Mainframes use the MAC address on two TICs (Token Ring Interface Cards) on dual backbone token-rings to improve availability and offer multiple paths to the host via source-routing.

Recommendation—No action is required.

(4) Possible Cause—A Station with a locally administered address has moved segments during the course of this analysis session.

Recommendation—No action is required.

Detection of Backdoor Bridge Suspected (IP)

Bridge-based internetworks often encounter problems associated with packet looping and conflicts between transparent bridges. This algorithm detects the existence of multiple root bridges, as follows:

1. For the first 90 seconds of analysis create a statistics table entry for each MAC address learned from a network frame containing a "Router Flag" field as to whether the frame MAC address is the address of a router. Initially set to FALSE, if a routing packet such as RIP or OSPF is identified from that address, the "Router Flag" will be set to TRUE.
2. After 90 seconds, statistics table entries will continue to be learned for MAC addresses, and also each TCP session between two IP addresses will be examined for their source and destination MAC addresses and a statistics table entry to describe the TCP session will be created if not already existing. The statistics table entry for this TCP session shall have a list of Source MAC address and a list of Destination MAC addresses in addition to the Source IP and Destination IP addresses of the connection.
3. If more than 1 MAC address is used as a source for the connection with only one MAC address used as the destination for the connection, then if the destination MAC address' "Router Flag" field is set to FALSE and one of the source MAC addresses has a "Router Flag" field set to TRUE, then the event has been detected.
4. If more than 1 MAC address is used as a destination for the connection with only one MAC address used as the source for the connection, then if the source MAC address' "Router Flag" field is set to FALSE and one of the destination MAC addresses has a "Router Flag" field set to TRUE, then the event has been detected.

This algorithm determines that a TCP connection has been seen going through a router but returning from a station that is not a router. A backdoor bridge is suspected. The connection involves station $STATION1 and $STATION2 and the router addresses involved are $ROUTER_MAC_ADDRESS1 and $ROUTER_MAC_ADDRESS2. Once the event has been detected the system infers a number of possible causes for the event and recommends actions to be taken to correct the problems.

Examples include:

(1) Possible Cause—You have a switched network in place with one or more routers connected. Somewhere a bridge (or another switch) has been inserted that causes the two stations to be able to communicate without the use of the router. But traffic continues to go through the router.

Recommendation—Check to make sure that there are no bridges crossing routed domains.

(2) Possible Cause—If you are using MPOA (Multi-Protocol Over ATM) then this event may not necessarily indicate a problem. MPOA cut-through session bypass the router many times only in one direction, which looks very much like a back-door bridge condition is occurring on the network.

Recommendation—No action is required.

Detection of Backdoor Bridge Suspected (IPX)

1. For the first 90 seconds of analysis create a statistics table entry for each MAC address learned from a network frame containing a "Router Flag" field as to whether the MAC address is the address of a router. Initially set to FALSE, if a routing packet such as RIP (Novell) or NLSP is identified from that address, the "Router Flag" will be set to TRUE.
2. After 90 seconds, statistics table entries will continue to be learned for MAC addresses, and also each IPX session between two IPX addresses will be examined for their source and destination MAC addresses and a statistics table entry to describe the IPX session will be created if not already existing. The statistics table entry for this IPX session shall have a list of Source MAC address and a list of Destination MAC addresses in addition to the Source IPX and Destination IPX addresses of the connection.
3. If more than 1 MAC address is used as a source for the connection with only one MAC address used as the destination for the connection, then if the destination MAC address' "Router Flag" field is set to FALSE and one of the source MAC addresses has a "Router Flag" field set to TRUE, then the event has been detected.
4. If more than 1 MAC address is used as a destination for the connection with only one MAC address used as the source for the connection, then if the source MAC address' "Router Flag" field is set to FALSE and one of the destination MAC addresses has a "Router Flag" field set to TRUE, then the event has been detected.

This algorithm determines that an IPX connection has been seen going through a router but returning from a station that is not-a router. A backdoor bridge is suspected. The connection involves station $STATION1 and $STATION2 and the router addresses involved are $ROUTER_MAC_ADDRESS1 and $ROUTER_MAC_ADDRESS2. Once the event has been detected the system infers a number of possible causes for the event and recommends actions to be taken to correct the problems. Examples include:

(1) Possible Cause—You have a switched network in place with one or more routers connected. Somewhere a bridge )or another switch) has been inserted that causes the two stations to be able to communicate without the use of the router. But traffic continues to go through the router.

Recommendation—Check to make sure that there are no bridges crossing routed domains.

(2) Possible Cause—If you are using MPOA (Multi-Protocol Over ATM) then this event may not necessarily indicate a problem. MPOA cut-through session bypass the router many times only in one direction, which looks very much like a back-door bridge condition is occurring on the network.

Recommendation—No action is required.

Expert System Process Flow

The expert system of the present invention combines a rules based knowledge base together with a structured interview analysis which allows the user to follow interview questions in focusing the problem definition. The system also allows for impromptu information to be entered by the user in supplementing the interview results, which is in consideration of the knowledge of more experienced users. As described above, the interview answers are used by the system to customize the default hiearchy of the rules, thereby allowing for improved accuracy and efficientcy in the problem diagnosis.

Figure 9:
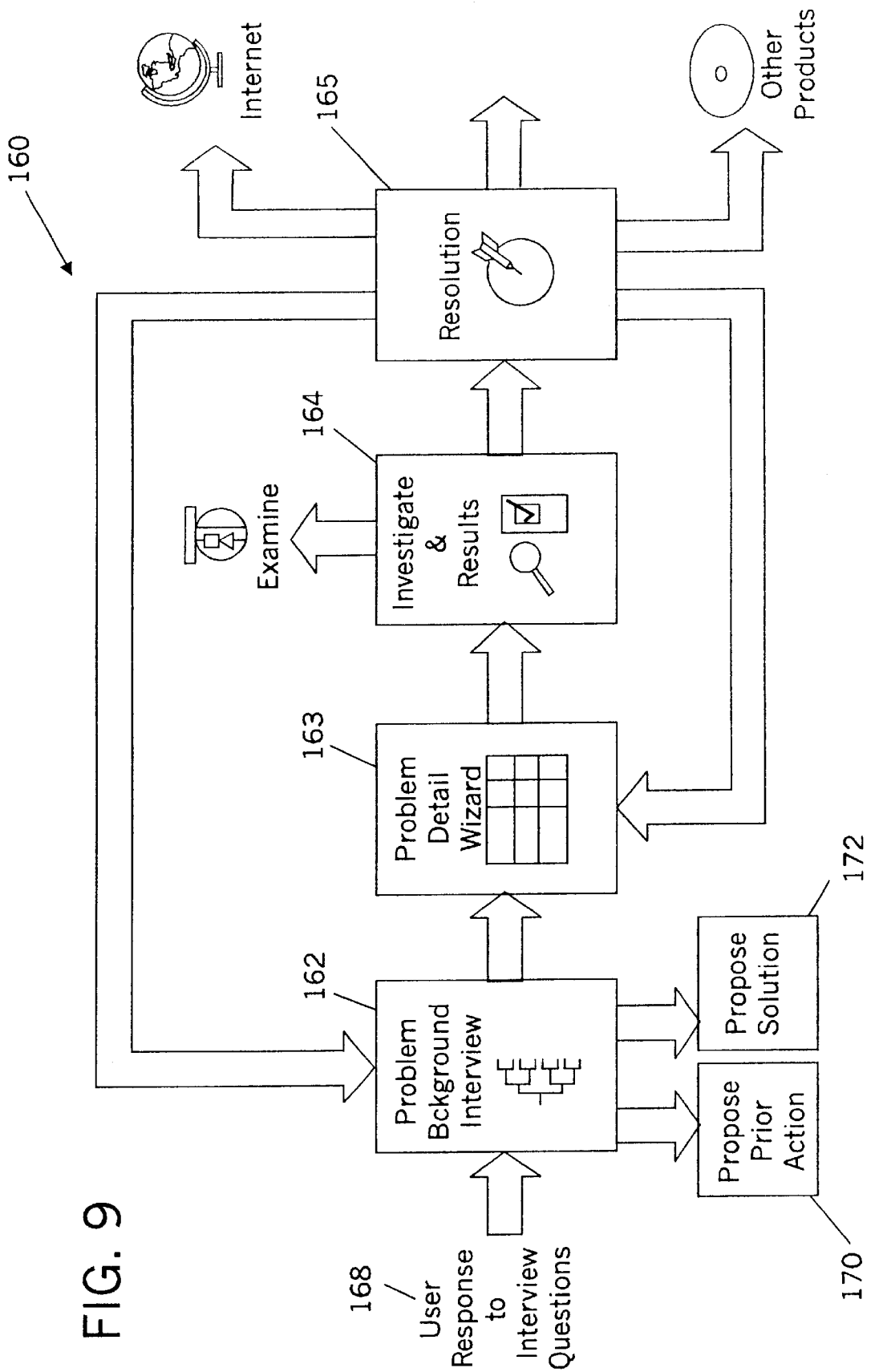
FIG. 9, is a process flow diagram illustrating the systemic performance elements of the expert system of the present invention.

Referring to FIG. 9, in a figurative illustration of the present expert system's process flow 160, the process includes four major phases 162–165. These phases are described as follows.

Phase 1—"Problem Background Interview"

Phase 1 is referred to as the "Problem Background Interview" 162, and it comprises a series of HTML screen menu pages that appear at the host computer GUI (48, FIG. 4) and which a user may navigate to identify the category of the network problem under investigation. While the expert system may be used proactively to help prevent major problems occurring on a network, in the majority of cases it is used to investigate reported problems. In this diagnostic function, instead of trying to solve a problem based on an ambiguous error message, such as the default error message "the network is slow", the present system interviews the user through a series of questions to understand the problem. In this manner the system focuses the reported problem and narrows the scope of probable causes as much as possible. The answers to the questions are used to set up the next step of the analysis.

Figure 10B:
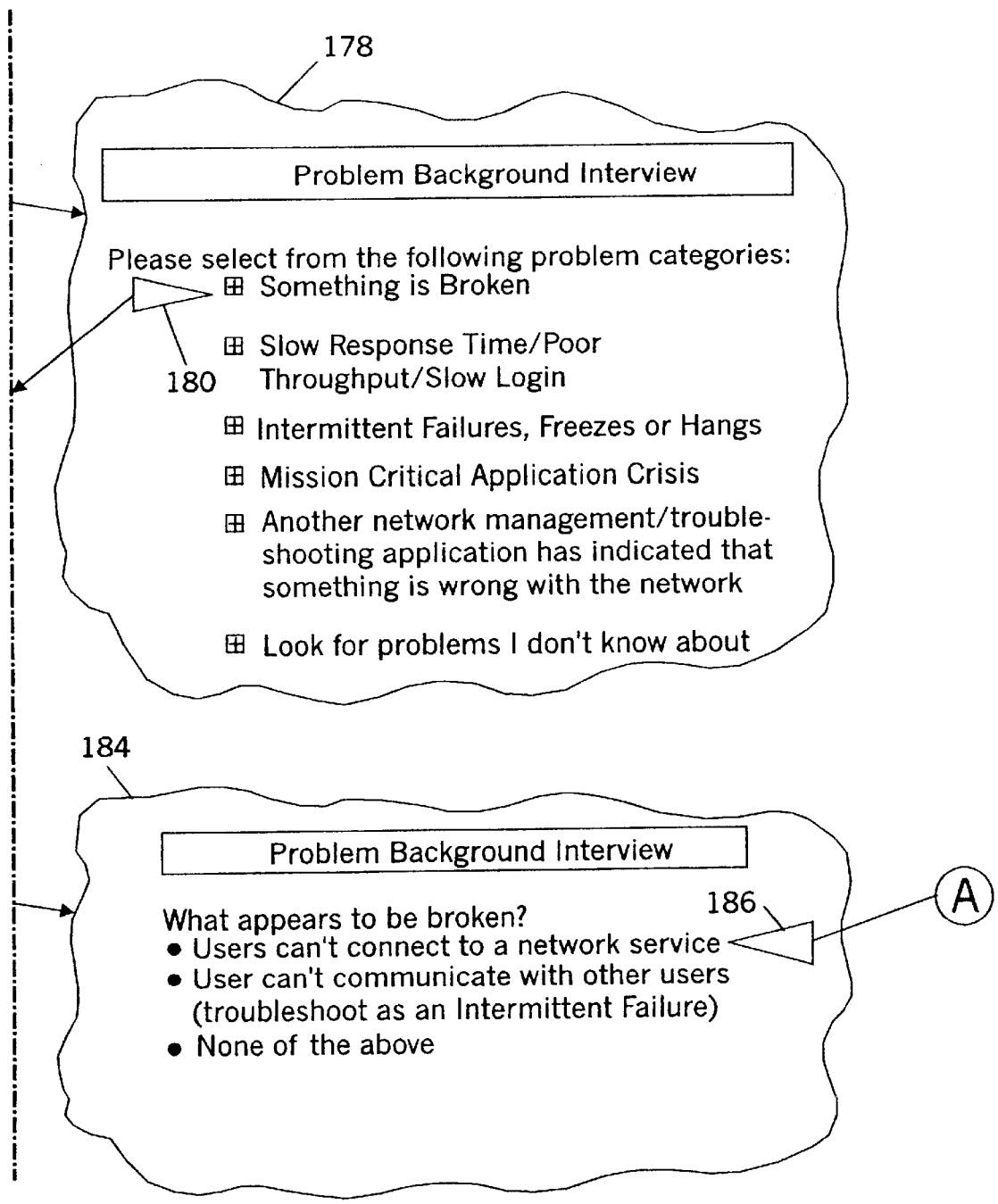
FIG. 10, is an illustrative composite of screen displays provided by one of the functional elements of FIG. 9 in an exemplary performance of the invention.
Figure 11B:
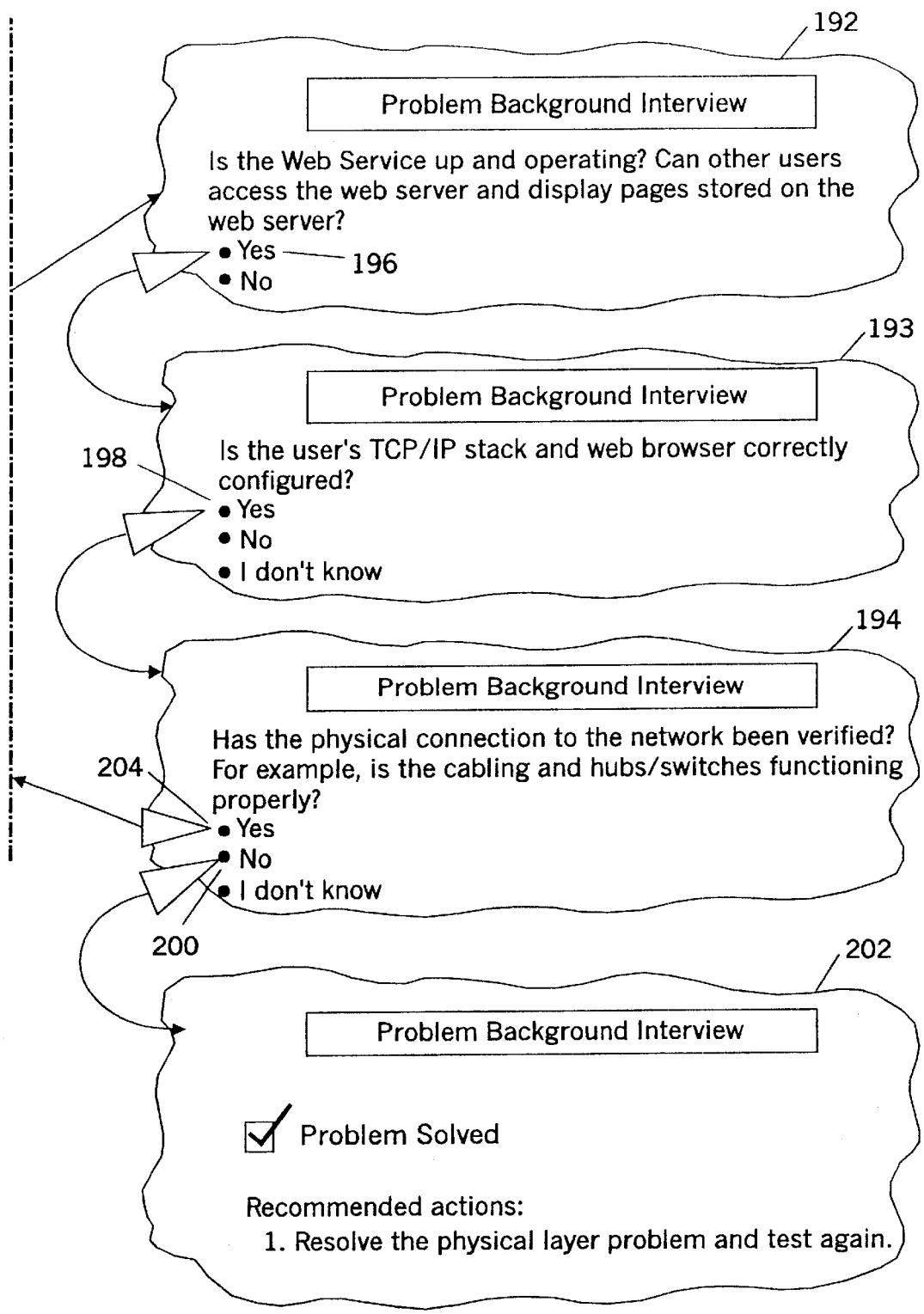
FIG. 11, is an illustrative composite of additional screen displays used in conjunction with FIG. 10.
Figure 12A:
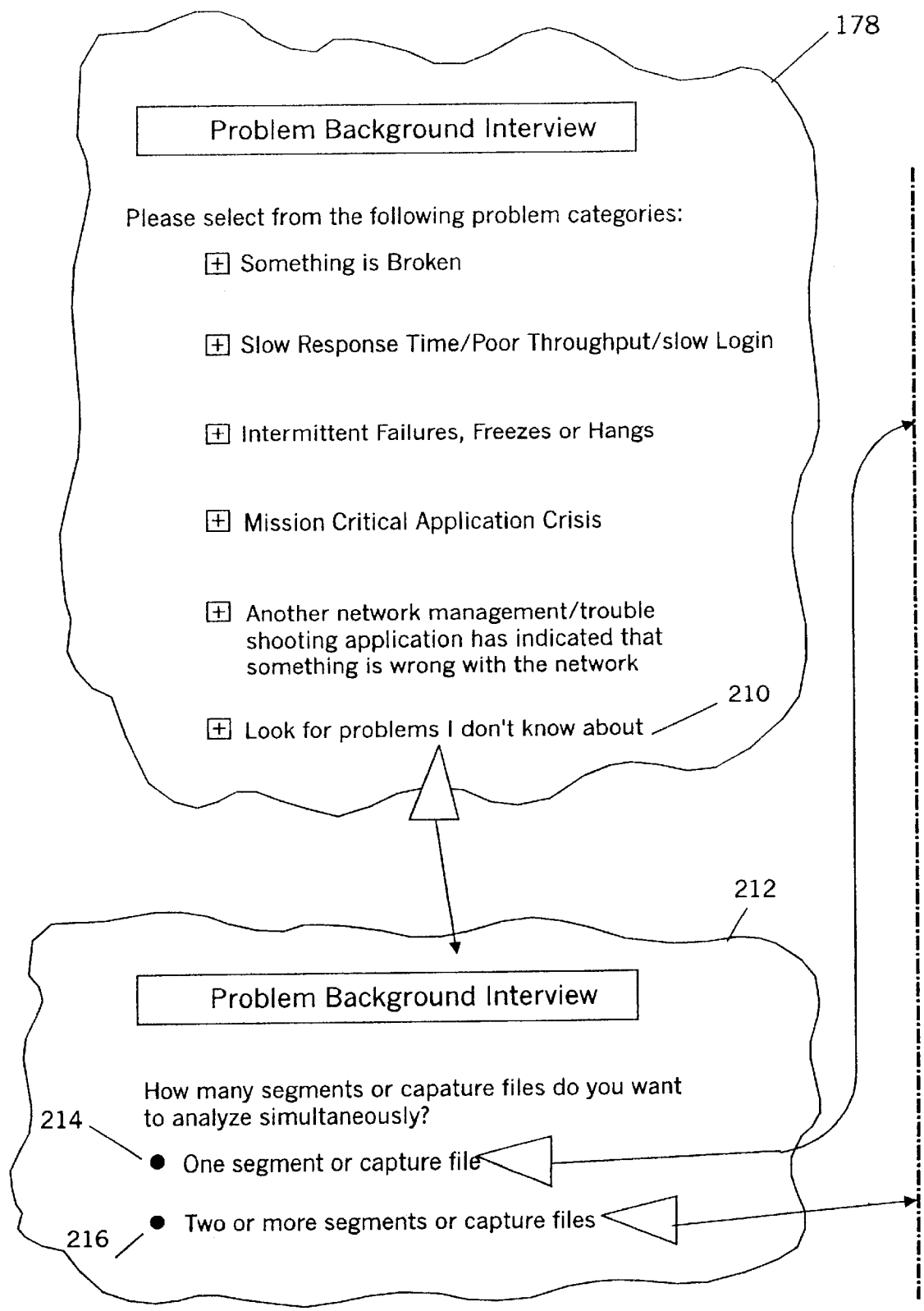
FIG. 12, is an illustrative composite of screen displays provided by the same FIG. 9 functional element that provided the screen displays of FIGS. 10, 11, but in an alternative exemplary performance of the invention.

This is achieved by having the user answer 168 a series of questions about the problem. In some problem instances, based on the user's answers, the system proposes prior actions 170 that the user take before proceeding to the analysis session set-up in the Phase 2 "Problem Detail Wizard". In certain instances the system may infer and propose solutions 172 to the stated problem, without having to go further. FIGS. 10–12 illustrate the interactive nature of the interview in terms of an example user/system exchange. Referring to FIG. 10 an opening screen 174 offers the user a number of selectable options, each of which are hypertext linked to background files. The options include a "Troubleshoot a New Problem" choice 176 which, when chosen, provides the first screen 178 of the "Problem Background Interview".

The screen 178 describes a number of descriptive statements of differing detail, from specific fault descriptions to a generalized "Something is Broken" status 180. Clicking on this text with a right mouse click displays background text, as shown at 182 on screen 178A. This background statement provides an expanded description, in sufficient detail, to allow the user to confirm whether this is the correct general field of the problem. By clicking on the text a hyperlink brings up screen 184 to allow the user to further narrow the problem. Assuming the problem relates to the inability of network users to connect to a network service 186, clicking on this text brings up screen 188, as shown in FIG. 11.

Referring to FIG. 11, screen 188 offers several descriptive choices to further narrow the definition of the service involved. Assuming the election is the Web service 190, succeeding screens 192–194 provide further narrowing of the specific fault conditions. First screen 192 determines if the web service is itself operating. Assuming the answer is YES 196, screen 193 determines if the user's protocol stack and browser are correctly configured. Again assuming a YES answer 198, the next screen 194 attempts to eliminate the network's physical connection as the problem. Here, if the user answer is NO 200, screen 202 announces a "Problem Solved" (i.e. 172, FIG. 9) and instructs the user to "Resolve the physical layer problem and test again", and the Interview phase is ended. Alternatively, if the answer to screen 194 is YES 204, screen 206 appears.

Screen 206 is the last screen page for this problem and includes a summary of the user entered conditions which, if incorrect, can be again selected and the interview jumps back to the related screen. These summary conditions are used by the expert system knowledge base to modify the default boundary conditions of the rules based analysis and to possibly alter some or all of the default priorities in reliance on the user answers. As evident, this better definition of the problem symptoms provides a greater opportunity for an accurate diagnosis, but also allows for faster execution of the analysis since the modification of the default conditions "streamlines" the analysis tree. Phase 1 ends when the user clicks on the "Click Here to troubleshoot this problem" 208 which is a hyperlink to an XAT (Expert Analysis Template) file. This XAT file contains all of the parameters entered so far, and the particular rules-based investigative techniques that the system will apply to the analysis session.

A converse to the above problem entry is where there is no user recognized problem and the object of the analysis session is to look for problems. Referring to FIG. 12, assuming that at the first definition screen 178 (FIG. 10) that the user elects the "Look for problems I don't know about." option 210. Since there is no problem definition with this option the analysis will follow the default set-up in terms of the rule parameters and priority. Screen 212 appears and asks whether there is one (214) or two (216) segments (or capture files) to be analyzed. Electing either statement brings up corresponding confirmatory screens (218, 220) which provide the interview summary and include the hyperlink from which the user can command the analysis. The process then proceeds to Phase 2.

Phase 2—"Problem Detail Wizard"

Figure 13:
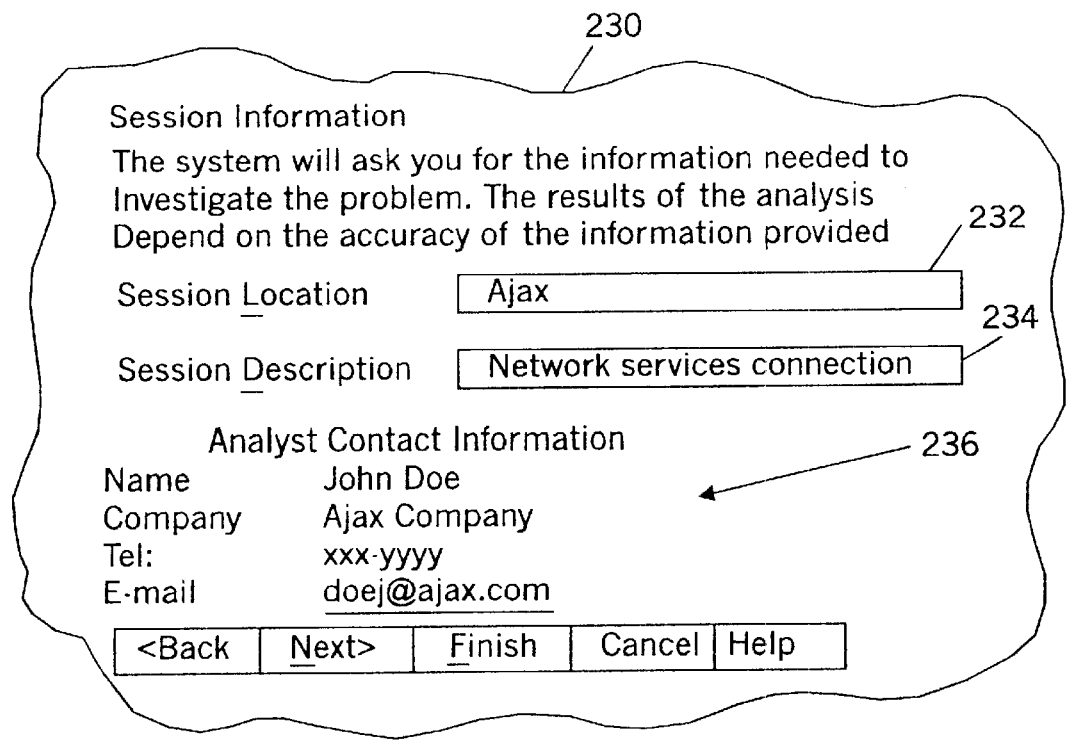
FIG. 13, is a figurative illustration of a screen display provided by another functional element of FIG. 9.

Referring again to FIG. 9, Phase 2 is the "Problem Detail Wizard" 163 which guides the user through the set-up of the network analysis session. During this step the expert system obtains additional information from the user, such as the name of the person doing the analysis, and through a series of GUI screen dialogs it asks detailed questions about the problem, such as the IP address of the server experiencing the problem. FIG. 13 is a figurative illustration of the "Session Information" introductory screen 230 of the Wizard 163 which requires the user to identify the session for record purposes by specifying the site location 232 ("Ajax") and a descriptive title for the session 234 ("Network services connection"). The user is also asked to enter their personal contact information 236.

Depending on the problem described, the present expert system may also automatically set-up software filters that provide further filtering of the data received from the user programmable LIM filters (the receive and transmit filters 54, 67 of FIG. 5) to further focus the data capture on frames concerning specific network devices (e.g. address of a server). This phase 2 is also used to select the data source, whether analysis is to be performed on-line, with real time protocol analyzer sensed data, or as an off-line analysis of a capture data file. Therefore, when the entries are completed in the Summary Screen 230 the user clicks on "Next" to access a "Select Source" screen 238 (FIGS. 14, 15) which allows the user to specify the type source of the data to be analyzed. This is either an "Analyzer" for an on-line analysis session or a "Capture File" in which the analysis is performed off-line. Depending on the source selection the "Select Source" screen displays the schedule of available sources of the chosen type.

Figure 14:
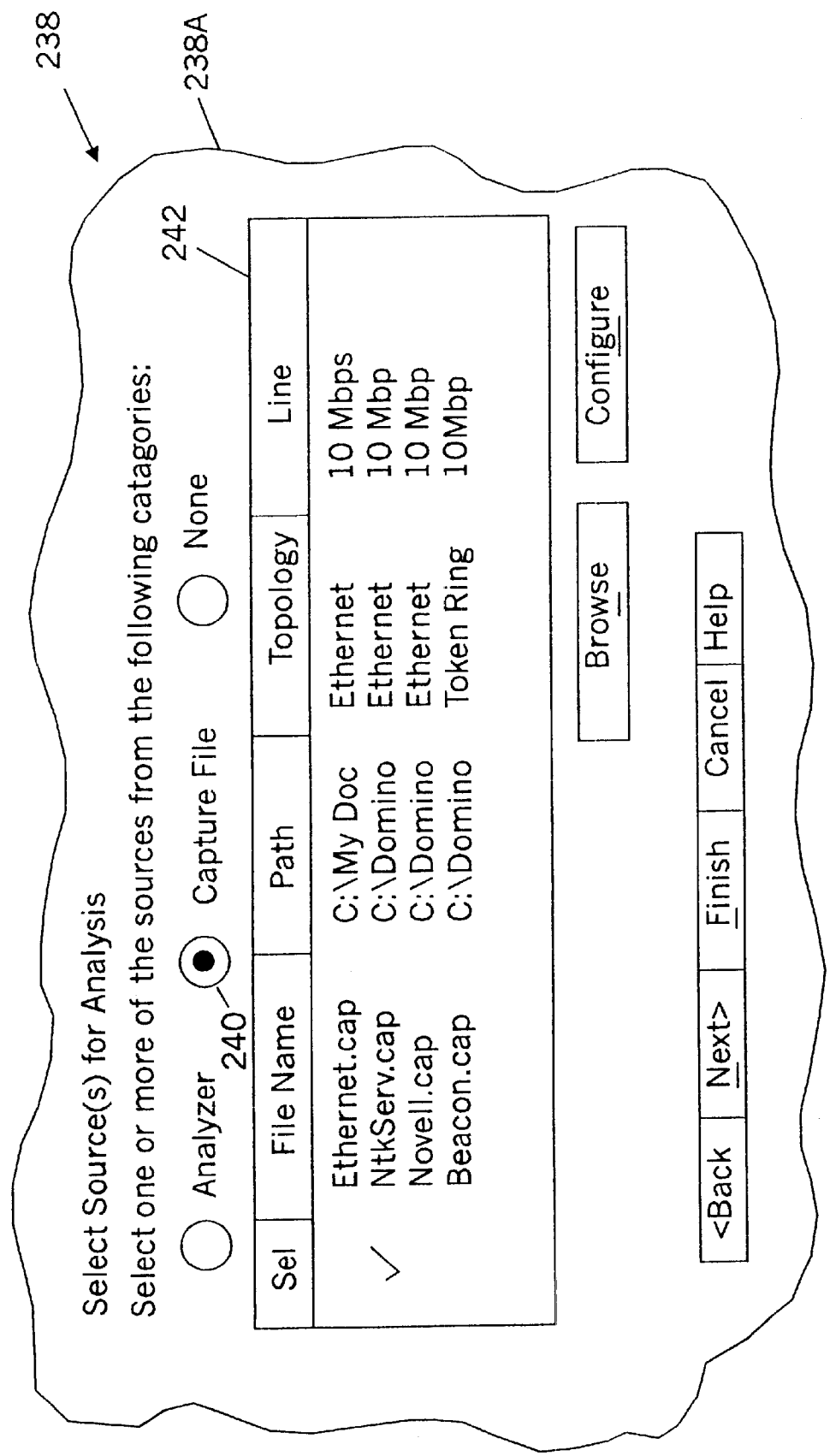
FIG. 14, is a figurative illustration of another screen display provided by the same FIG. 9 performance element that provided the screen display of FIG. 13.

FIG. 14 illustrates a "Capture File" formatted display 238A for the Select Source screen. As shown the Capture File selection 240 is checked and a Configuration Table 242 lists the data capture files which are known to the system. In this example the user designates the listed Configuration Table 242 source (with the browser software and mouse) as the "NtkServ.cap" data file in the path C:\Domino. The data file's network topology (Ethernet) and line speed (10 Mbps) are also shown. If the previously entered "Problem Background Interview" indicates a problem involving two network segments, the Phase 2 Problem detail Wizard will prompt the user to define a data source for each segment.

Figure 16:
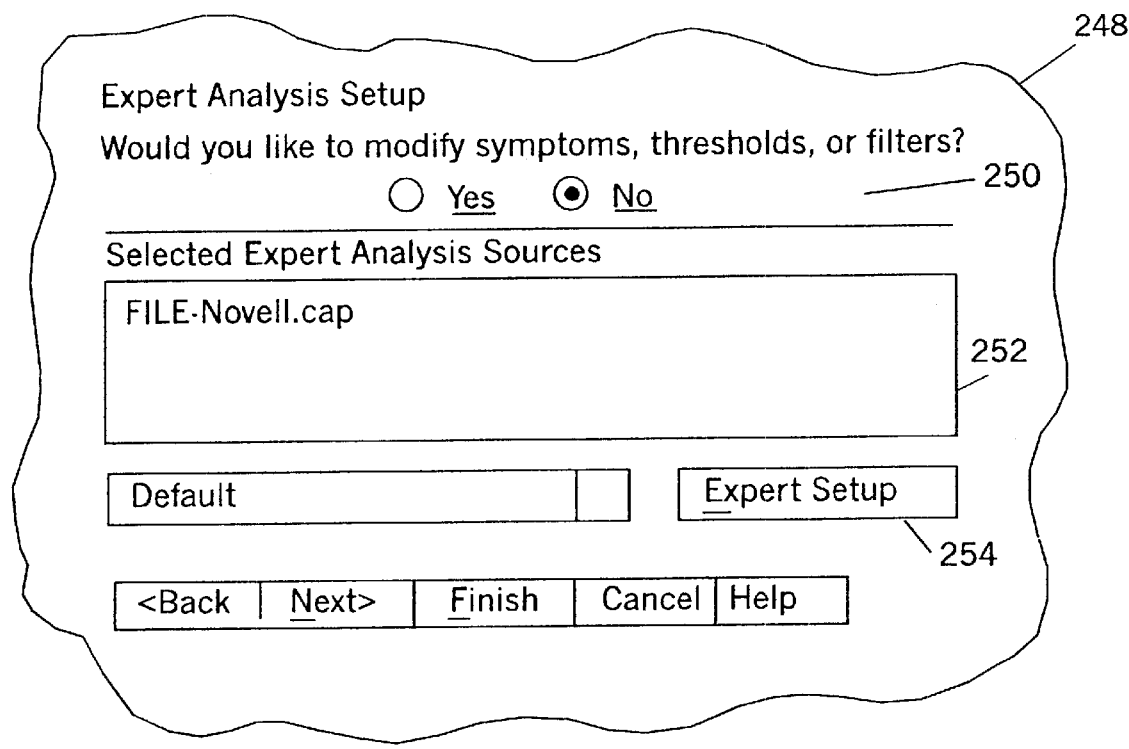
FIG. 16, is a figurative illustration of yet another screen display provided by the same FIG. 9 performance element that provided the screen display of FIG. 13.
Figure 15:
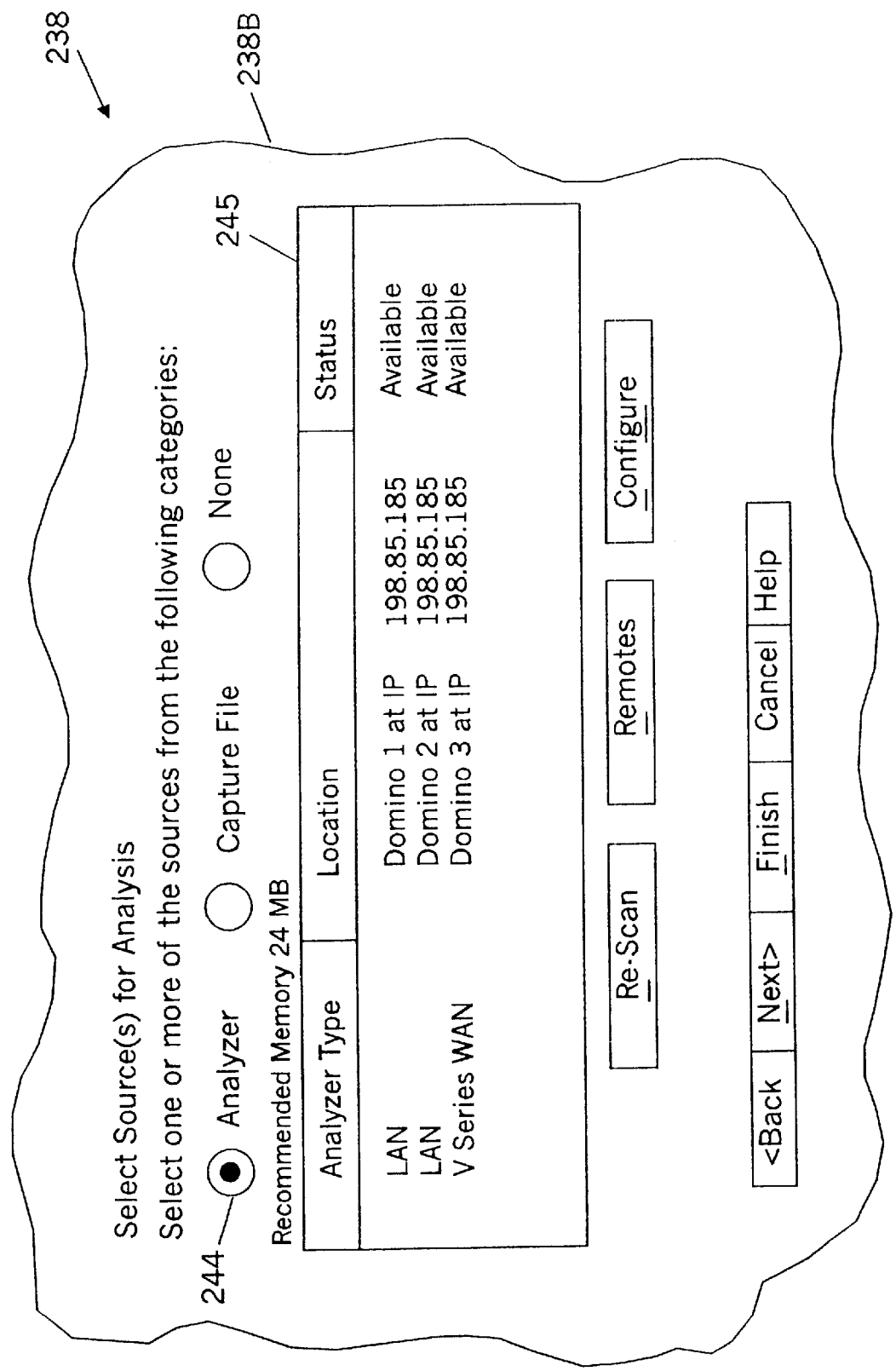
FIG. 15, is a figurative illustration of yet another screen display provided by the same FIG. 9 performance element that provided the screen display of FIG. 13.

FIG. 15 illustrates the Select Source screen in its "Analyzer" display format 238B with the Analyzer selection 244 checked. The screen 238B Configuration Table display 245 identifies the analyzers which are known to be available to the system and lists their IP address and availability status. The user can also identify new analyzers or change the listed configuration information using the "configure" function 246. When finished with the 238A or 238B screen displays the user saves the configuration information and clicks "Next" for the following screen which, in the best mode embodiment, is an "Expert Analysis Setup"screen 248, shown in FIG. 16.

When an analysis session is run the present expert system analyzes the data from the specified sources and reports network events that appear to be symptomatic of the problem described in the Background Interview. While the present system automatically sets the threshold values and infers the priority ranking of the sensed network events that will apply to the analysis session based on a default prioritization, it allows the user to change any one or all of these default threshold settings or event priorities. An experienced user with network familiarity may wish to limit the event reports to those which the user believes are most significant to the problem, i.e. "tailor the analysis". This Expert Analysis Screen allows for this customization. The user is prompted to enter yes/no 250 ("no" shown checked), may modify the sources listed in the Table 252 and use the "Expert Setup" function 254 to configure event thresholds and customize the detectable severity level of specific events. With this option the user may also require the launch of special programs, or stop the capture buffer whenever a specified event occurs. When the option is selected a dialog box appears (not shown) which facilitates the customization.

Figure 18:
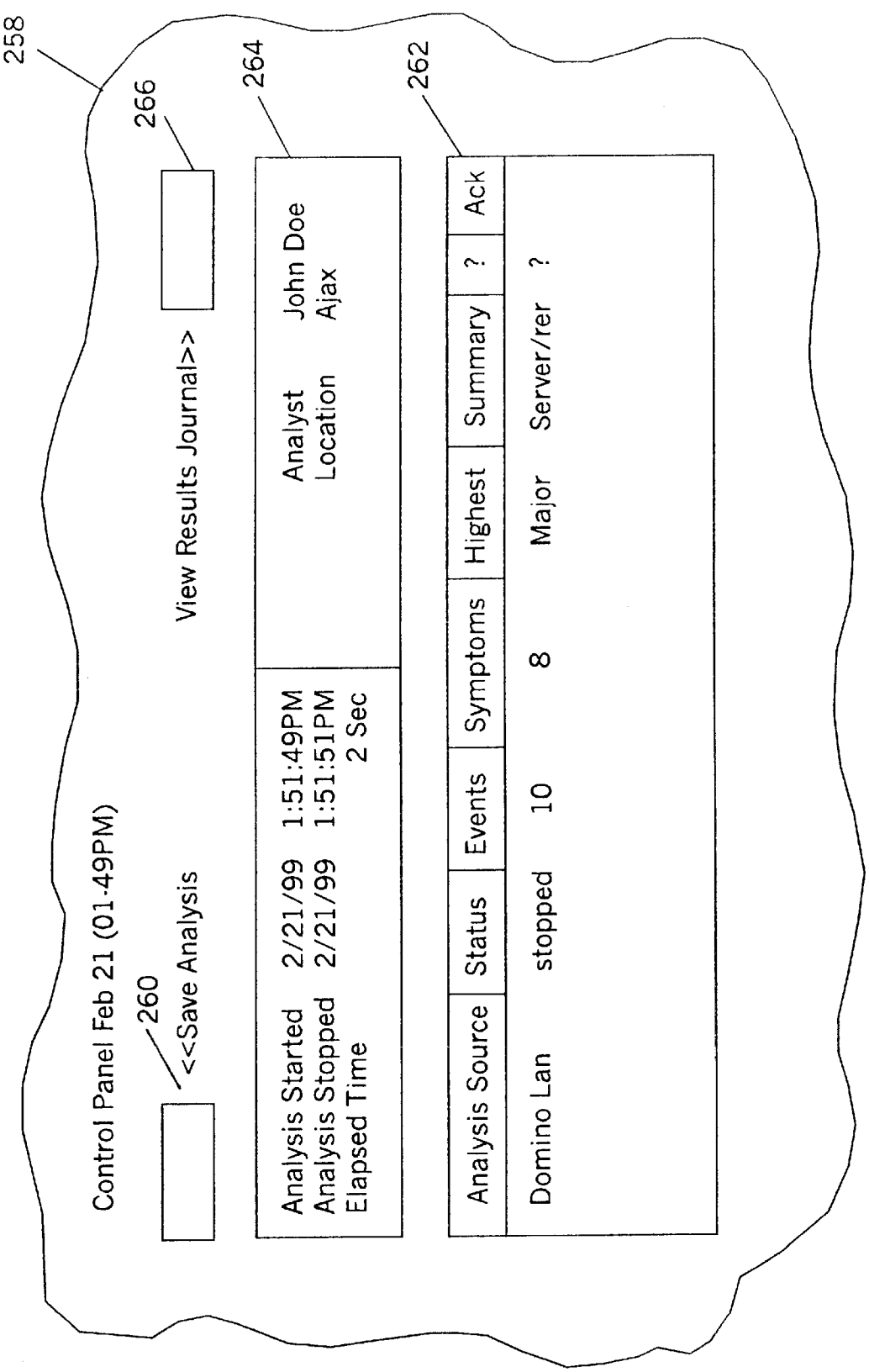
FIG. 18, is a figurative illustration of yet another screen display provided by the same FIG. 9 performance element that provided the screen display of FIG. 13.

The screen page following the Expert Analysis Setup is a "Summary Screen" 256, as shown in FIG. 17. The user reviews the Summary 257 for completeness and accuracy and clicks "Finish", following which a "Control Panel Screen" 258 appears, as shown in FIG. 18. The user starts the analysis and if the analysis is being performed with an on-line analyzer (as opposed to a capture file) the analysis continues until stopped by the user. When the session is stopped the user is prompted to save the analysis results 260 to an Expert Analysis Session (.XAS) file and to save the captured network data to a capture (.CAP) file. The Control Panel display 262 reports the session events that were recorded, the symptoms, and the major/minor status. The screen also provides session identification data 264.

Phase 3—"Investigation and Results"

Phase 3 is the active investigation phase 164 of the process, in which the expert system analyzes network frames (see FIG. 28), correlates the analysis-derived statistics of these frames with the measured statistics gathered by the LIM (if applicable for the given monitoring session), and generates "events" and "symptoms" of positive or negative events detected or inferred based on the expert system's embedded expert heuristic algorithms. These events and symptoms are accumulated in a Results Journal, which is described in detail hereinafter, and which is sometimes referred to as a "Problem Notebook". The Results Journal displays the statistics and descriptions of events and symptoms in catalogued fashion to the user.

Figure 19:
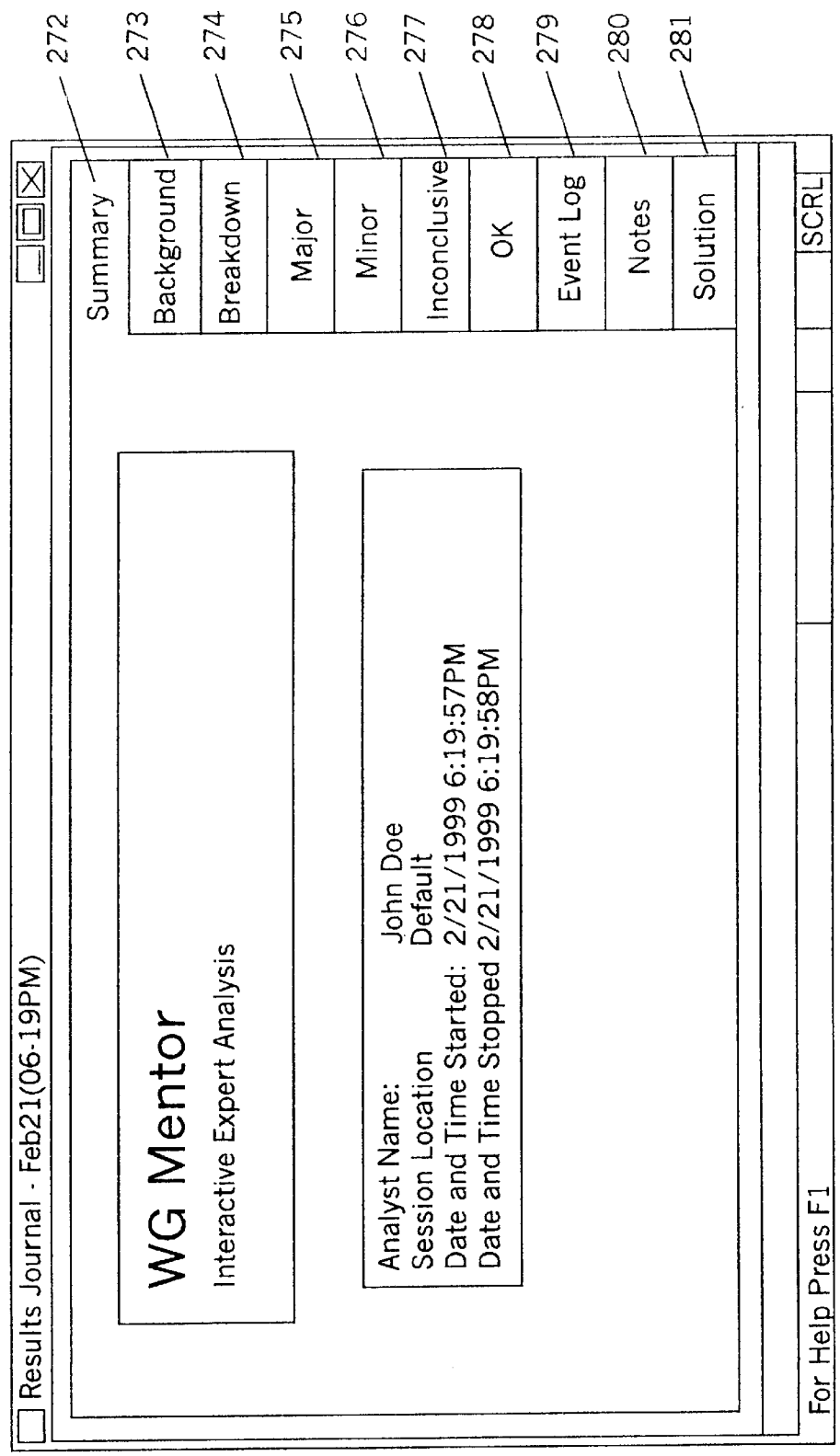
FIG. 19, is a figurative illustration of a screen display provided by yet another performance element of FIG. 9.

The user can select the "View Results Journal" button 266 on the Control Panel Screen 258 and the title screen of the system's Results Journal is displayed as shown, beginning with FIG. 19. Using the Results Journal summary, the user can quickly determine which events are important. If the user determines that an event is not an issue to the present problem, he or she can simply acknowledge the reported event and the system "hides it from view", which then allows the user to proceed to the next event. If the user wants to view the system's recommendations for problem solution they can select the expert help function from the screen window, or proceed to the Results Journal to see additional information. The user can also "jump" directly to the data for the frame (in the post capture file) that triggered the event. Additionally the Results Journal contains all information entered in Phase 1 and Phase 2, plus allows the user to put in their own comments.

Phase 4—Recommendations

Phase 4 is the resolution phase of the process. All of the information collected during the interview process, the setting up process, and the results of the analysis, are stored in ajournal-style Results Journal. A tab denotes each major section. By clicking on the Major or Minor tabs, the user can see those events that concern the problem described in the interview process. Within these tabs, the user can find detailed statistics and dynamic expert help that uses information about the event to provide suggested recommendations. If the user is unable to solve the problem, the expert system offers them several additional recommendations to improve the analysis.

Each event or symptom identified in the Results Journal has an associated "Expert Help" routine which defines what that event or symptom is, what might have caused it, and what further actions the user may next take. The user may also use the statistics accumulated by the system in the monitoring session to look at further possible causes of the problem. If the problem is not resolved based on this advice, the system offers "Recommended Next Steps". These are a list of steps identifying other possible causes of the problem. If the problem is still not resolved after following these steps the user may return to Phase 1 and attempt to restate the problem from among the listed symptoms.

Results Journal

The present Mentor expert system uses a "Results Journal" to record all information identified during the analysis of a network problem. This Journal better facilitates problem documentation and makes it easier to "escalate" the analysis/diagnosis of the problem to another user or to a more experienced network analyst. The "Results Journal" is presented to the user in a series of selectable windows, or screens, each of which represented a catalogued aspect of the results tabulation.

The Results Journal captures and displays to the user all of the information that the expert system has assembled about a particular network problem during a troubleshooting session. It organizes the information for convenient review, with an Event Log (described hereinafter with respect to FIG. 26) that lists all of the events that the system has detected, and separate pages for "Major" (FIG. 22), "Minor" (FIG. 23), "Inconclusive" (FIG. 24), and "OK" (FIG. 25) events.

FIG. 19 illustrates the first screen, or "Cover Page" 270 of the Results Journal, and it lists the information identifying the session, including the name of the user/analyst, where the session was held, date, and time. As can be seen form the illustration of the Cover Page 270 in FIG. 19, the Results Journal uses "Section Tabs" 272–281 to identify the divided sections of the Journal and which allow the user to move between the pages of each section and between sections. As may be seen from the organization of the tabs 272, each succeeding section contains additional information about the analyzed problem, or what has been discovered about the problem.

FIG. 20 illustrates the screen content of the Section tab 273, labeled "Background", which provides a Background screen display 284 that lists the information identified during the "Problem Background Interview" and "Problem Detail Wizard" phases (Phase 1 and 2) of the expert system process flow of FIG. 9.

FIG. 21 illustrates the screen content of the Section Tab 274, labeled "Breakdown" which provides a screen display 286 of the symptoms and events that the expert system has identified during the course of its investigation. This page allows selection of which events/symptoms to display that affects all pages of the Results Journal. This page shows a breakdown of what events or symptoms have been identified by the layers of analysis that the application performs. It also shows a listing of the events identified, their severity, and the count of events. It is recommended that the user begin the review of the session results with the data on the Breakdown page and then proceed to the event description tabs, beginning with the "Major" events Section Tab 275, which lists the detected events having the highest level of severity, and then proceeding to the "Minor" (Tab 276), the "Inconclusive"(Tab 277) and the "OK" (Tab 278) Sections.

FIG. 22 illustrates the screen content of the Section Tab 275, labeled "Major". The screen display 288 lists the events 290 that are most likely to be significant in solving the problem. These are the events that should be investigated first. In the sample screen shown events 1–7 each have the same "Summary" 292 ("Server/Router Using Multiple Encapsulations"), but each identified under the "Description" column 294 as related to a different router (only partially shown in the illustration). Similarly, although partially shown, the description accompanying each identified router provides the counsel that this leads to excess Broadcast traffic. The Final reported event (No. 8) reports a "Broadcast Storm". The Broadcast Storm event is registered when the occurrence of broadcast frames exceeds 250 frames in a 5 second interval.

The screen pages of the Minor (Section Tab 276), Inconclusive (section Tab 277), and OK (Section Tab 278) each have a display format similar to the screen display 288 of the Major Section Tab 275, and are not individually shown. Referring to FIG. 22, the displayed events in each of these Minor, Inconclusive, and OK tabs are similarly listed in separate columns of their display, with one event listed for each horizontal row of cells. Each event has a unique event number (unique to a specific analyzer or capture file), as in the "Event" column 290 of FIG. 22, and the "Ack" column 296 (FIG. 22) allows the user to acknowledge an event. As also shown in FIG. 22, the question mark "(?)" column 298 allows the user to access Expert Help for the event and the "View" column 300 allows the user to drill down into supporting statistics views to verify the statistics behind the event. The View column also allows the user to drill down into the protocol decodes of the frames that have been analyzed via the "Examine" product. The Description column 294 provides a verbal description of the event with specific information related to the event such as network addresses involved in the event.

FIG. 23 illustrates the screen display 302 of the Section Tab 279, which is referred to as the "Event Log". The Event Log screen is similar in format to the previous four at Tabs 275–278, but with several differences. The events in the Event log are unfiltered; that is all of the events detected are recorded. They are recorded chronologically as illustrated in the "Date/Time" column 304. The Event log display also includes a "Severity" column 306 which identifies recorded event status as Major, Minor, Inconclusive, or OK, thereby providing a chronological composite of all detected events. The remaining columns are identical with those discussed in reference to the Major screen of FIG. 22. FIG. 24 illustrates the screen display 308 of the Section Tab 280, which is referred to as the "Notes" page, which is used for user-entered comments that will be recorded to the system's session database.

FIGS. 25–27 show the format and the change in the screen content of the expert system's "Solution" Section Tab 281. This is the "Solution Page 310 and it incorporates several screen versions, each of which represent the system's interactive response to answers provided by the user in response to screen displayed questions. In FIG. 25 the Solution page 310 displays a version 310 310A in response to a "no" answer by the user in response to the screen question 312 which asks if the session information had been reviewed. This version responds with the recommended text formatted instructions 314. The intent here is to make sure that the user has read through all of the events that may be contributing to the problem. In addition button 315 provides help on using the results Journal.

FIG. 26 assumes a YES answer to the question 312 and the Solution page 310 displays version 310B in response to the user answer no to screen question 316 admitting that the problem has not been solved. If the user has read through all of the events discovered and has not been able to isolate the cause of the problem, the system offers in version 310B advise on what else to investigate about the problem by having the user click on the "Click here for further instructions" button 318 which calls up the "Recommended Next Steps" utility.

In FIG. 27, screen version 310C of the Solution page 310 assumes the user has determined the cause of the problem (a YES to question 316) and requires the user to record the cause of the problem in the screen register, or text box 320 for future reference. The entry is then recorded into the session database along with all of the session events and statistics gathered by the program.

Finally, is an illustration of a displayed tabular real time statistics composite 322 as may be provided by the system.

As shown the composite lists frame number 324, the absolute time 326 in addition to the quantitative data regarding source and destination addresses, and a system "interpretation" 328 of the statistic. The FIG. 28 display may be obtained by having the user drill down through the tabulated Results Journal data.

The present expert system combines user available information, heuristics and rules based inference to analyze network:performance and to diagnose performance problems. It does this in the four phase consultant's approach in which the first two phases are used to acquire information from the user through a series of structured interview questions designed to narrow the performance issues to be diagnosed.

Since accuracy of the analysis and diagnosis is directly dependent on the completeness and integrity of the acquired data the present invention the expert system uses an improved real time capture and analysis algorithm to provide a real time composite of the measured and analysis-derived statistics, to provide a high degree of measured performance accuracy. The system then prioritizes the events to be analyzed based on the answers to the questions, acquires the data, and creates a special session folder containing all pertinent information on a troubleshooting session.

It presents the data, together with the recommendations for solution, in a journal-style report. All of the supporting data on which the report is based is available to the user in a GUI display interface which readily allows the user to "drill down" to the supporting level of data that they are most comfortable with. In this manner it provides an analysis tool which may be used by novices as well as experienced professionals in the networks field. The present expert system is also able to analyze information gathered from different network segments simultaneously, and present results of the analysis within a single application view. This allows for easier correlation of events happening on the segments being analyzed by integrating the events into the report journal, together with offering the user the ability to drill-down into each segment's acquired data.

Although the invention has been shown and described with respect to a best mode embodiment thereof, it should be understood by those skilled in the art that various changes, omissions, and additions may be made to the form and detail of the disclosed embodiment without departing from the spirit and scope of the invention, as recited in the following claims.

We claim:

1. A method of obtaining analysis-derived statistics relating to signal traffic over a network, comprising:

acquiring sample network signal frames in real time within a monitoring session;

tagging each acquired sample frame with a time stamp and with a frame number, the time stamp identifying the sample frame's real time of acquisition, and the frame number identifying its relative placement among a sequence of acquired sample frames within said session;

storing succeeding sample frames at succeeding available address locations among a first group of address locations in signal memory;

analyzing each stored sample frame to obtain an analysis-derived statistic therefrom;

storing each analysis-derived statistic in association with the time stamp and frame number of its related analyzed sample frame at one of a second group of address locations in signal memory; and reporting said analysis-derived statistics in a format which evidences the real time of occurrence of each statistic within the session.

2. The method of claim 1, further including:

marking each of said first group of address locations in signal memory as available address locations at the beginning of a monitoring session;

prioritizing said available address locations in a sequence of next available address locations;

pointing to each next available address location of said sequence as the storage location for each next succeeding acquired sample frame; and removing the address location of each stored sample frame from said sequence of next available address locations.

3. The method of claim 2, further including:

marking the address location of each such analyzed sample frame as a present available address location at which to store an acquired sample frame in signal memory; and adding each said present available address location to said sequence of next available address locations.

4. The method of claim 3, further including:

discarding an acquired sample frame in the absence of an identified next available address location in said first group of address locations;

recording the time stamp and frame number of each said discarded acquired sample frame; and maintaining a count of the total number of discarded sample frames in a monitoring session.

5. The method of claim 4, wherein the step of reporting includes:

identifying in the format the real time of acquisition of each discarded frame in a manner which quantifies the number and real time of discarded sample frames within a monitoring session.

6. The method of claim 5, further including:

sequencing the retrieval of the stored analysis-derived statistics, as necessary, to present the reporting of the analysis-derived statistics in the frame number sequence of their respective associated sample frames.

7. A method of providing a real time composite of measured statistics and analysis derived statistics relating to signal traffic over a network, comprising:

obtaining measured statistics of selected events occurring in the network signal traffic within a monitoring session and tagging each measured statistic with a time stamp identifying the statistic's real time of occurrence;

acquiring sample network signal frames in real time within the monitoring session, and tagging each acquired sample frame with a time stamp and with a frame number, the time stamp identifying the sample frame's real time of acquisition and the frame number identifying its relative placement among a sequence of acquired sample frames within a session;

storing succeeding sample frames in association with their time stamp and frame number at succeeding available address locations among a first group of address locations in signal memory, and storing the measured statistics in association with their time stamp at address locations among a second group of address locations in signal memory;

analyzing each stored sample frame to obtain an analysis-derived statistic value therefrom;

storing each analysis-derived statistic value in association with the time stamp and frame number of its related analyzed sample frame in signal memory; and reporting the stored measured statistics and the stored analysis-derived statistics in a format which evidences a composite of the real time of occurrence of each measured statistic and of each analysis-derived statistic within the session.

8. The method of claim 7 wherein the step of storing each derived statistics value further includes storing each derived statistic in association with the measured statistics in the second group of address locations in signal memory.

9. The method of claim 7, further including:

marking each of said first group of address locations in signal memory as available address locations at the beginning of a monitoring session;

prioritizing said available address locations in a sequence of next available address locations;

pointing to each next available address location of said sequence as the storage location for each next succeeding acquired sample frame; and removing the address location of each stored sample frame from said sequence of next available address locations.

10. The method of claim 9, further including:

marking the address location of each such analyzed sample frame as a present available address location at which to store an acquired sample frame in signal memory; and adding each said present available address location to said sequence of next available address locations.

11. The method of claim 10, further including:

discarding an acquired sample frame in the absence of an identified next available address location in said first group of address locations;

recording the time stamp and frame number of each said discarded acquired sample frame; and maintaining a count of the total number of discarded sample frames in a monitoring session.

12. The method of claim 11, wherein the step of reporting includes:

identifying in the reporting format the real time of acquisition of each discarded frame in a manner which quantifies the number and the real time of acquisition of the discarded sample frames within a monitoring session.

13. A protocol analyzer, adapted for use with a host computer to acquire statistics related to network signal traffic occurring in a monitoring session, and for reporting the acquired statistics to the host computer, the analyzer comprising:

line interface module (LIM) circuitry, having a LIM signal processor and LIM signal memory for storing signals, including program signals for controlling the LIM signal processor in:

acquiring sample network signal frames in real time and tagging each with a time stamp identifying its real time of acquisition and with a frame number identifying its relative placement in the sequence of acquired frames within the session;

the analyzer further comprising:

protocol analyzer module (PAM) circuitry, having a PAM signal processor adapted for communication with the LIM signal processor and having a PAM signal memory for storing signals, including program signals for controlling the PAM signal processor in:

storing succeeding sample frames at succeeding available address locations among a first group of address locations in the PAM signal memory;

analyzing each stored sample frame to obtain an analysis-derived statistic therefrom;

storing each analysis-derived statistic in association with the time stamp and frame number of its related analyzed sample frame at one of a second group of address locations in the PAM signal memory; and uploading said analysis-derived statistic values to the host computer in a format for reporting the real time of occurrence of each statistic within the session.

14. The protocol analyzer of claim 13, wherein the program signals further control the PAM signal processor in:

marking each of said first group of address locations in signal memory as available address locations at the beginning of a monitoring session;

prioritizing said available address locations in a sequence of next available address locations;

pointing to each next available address location of said sequence as the storage location for each next succeeding acquired sample frame; and removing the address location of each stored sample frame from said sequence of next available address locations.

15. The protocol analyzer of claim 14, wherein the program signals further control the PAM signal processor in:

marking the address location of each such analyzed sample frame as a present available address location at which to store an acquired sample frame in signal memory; and adding each said present available address location to said sequence of next available address locations.

16. The protocol analyzer of claim 15, wherein the program signals further control the PAM signal processor in:

discarding an acquired sample frame in the absence of an identified next available address location in said first group of address locations;

recording the time stamp and frame number of each said discarded acquired sample frame; and maintaining a count of the total number of discarded sample frames in a monitoring session.

17. The protocol analyzer of claim 16, wherein the program signals further control the PAM signal processor in:

uploading the analysis-derived statistics to the host computer in a format which also identifies the real time of acquisition of each discarded frame in a manner which quantifies the number and real time of discarded sample frames within a monitoring session.

18. The protocol analyzer of claim 17, wherein the program signals further control the PAM signal processor in:

sequencing the uploading of the stored analysis-derived statistics, as necessary, to present the reporting format of the analysis-derived statistics in the frame number sequence of their respective associated sample frames.

19. A protocol analyzer, adapted for use with a host computer to acquire real time measured statistics and analysis-derived statistics relating to network signal traffic occurring in a monitoring session, and for reporting the acquired statistics to the host computer, the analyzer comprising:

line interface module (LIM) circuitry, having a LIM signal processor and having a LIM signal memory for storing signals, including program signals for controlling the LIM signal processor in:

obtaining measured statistics of selected events occurring in the network signal traffic the monitoring session and tagging each measured statistic with a time stamp identifying the statistic's real time of occurrence;

acquiring sample network signal frames in real time within the monitoring session, and tagging each acquired sample frame with a time stamp and with a frame number, the time stamp identifying the sample frame's real time of acquisition and the frame number identifying its relative placement among a sequence of acquired sample frames within the session;

the analyzer further comprising:

protocol analyzer module (PAM) circuitry, having a PAM signal processor adapted for communication with the LIM signal processor, and having a PAM signal memory for storing signals, including program signals for controlling the PAM signal processor in:

storing succeeding sample frames in association with their time stamp and frame number at succeeding available address locations among a first group of address locations in signal memory, and storing the measured statistics in association with their time stamp at address locations among a second group of address locations in signal memory;

analyzing each stored sample frame to obtain an analysis-derived statistic value therefrom;

storing each analysis-derived statistic value in association with the time stamp and frame number of its related analyzed sample frame in signal memory; and uploading the stored measured statistics and the stored analysis-derived statistics to the host computer in a format which reports the real time of occurrence of each measured statistic and each analysis-derived statistic within the session.

20. The protocol analyzer of claim 19, wherein the program signals further control the PAM signal processor in:

storing each derived statistic in association with the measured statistics in the second group of address locations in signal memory.

21. The protocol analyzer of claim 19, wherein the program signals further control the PAM signal processor in:

marking each of said first group of address locations in signal memory as available address locations at the beginning of a monitoring session;

prioritizing said available address locations in a sequence of next available address locations;

pointing to each next available address location of said sequence as the storage location for each next succeeding acquired sample frame; and removing the address location of each stored sample frame from said sequence of next available address locations.

22. The protocol analyzer of claim 21, wherein the program signals further control the PAM signal processor in:

marking the address location of each such analyzed sample frame as a present available address location at which to store an acquired sample frame in signal memory; and adding each said present available address location to said sequence of next available address locations.

23. The protocol analyzer of claim 22, wherein the program signals further control the PAM signal processor in:

discarding an acquired sample frame in the absence of an identified next available address location in said first group of address locations;

recording the time stamp and frame number of each said discarded acquired sample frame; and maintaining a count of the total number of discarded sample frames in a monitoring session.

24. The protocol analyzer of claim 23, wherein the program signals further control the PAM signal processor in:

identifying in the reporting format the real time of acquisition of each discarded frame in a manner which quantifies the number and the real time of acquisition of the discarded sample frames within a monitoring session.

* * * * *